(12) United States Patent
Boudreau

(10) Patent No.: US 6,697,819 B2
(45) Date of Patent: Feb. 24, 2004

(54) REUSABLE DATABASE ACCESS COMPONENT

(75) Inventor: Michael Kevin Boudreau, Huntington Beach, CA (US)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 09/918,769

(22) Filed: Jul. 30, 2001

(65) Prior Publication Data

US 2003/0023596 A1 Jan. 30, 2003

(51) Int. Cl.⁷ .............................................. G06F 17/30
(52) U.S. Cl. .................... 707/103; 707/102; 707/4; 717/106; 717/108; 717/112
(58) Field of Search .............................. 710/242; 707/4, 707/100–103, 104; 345/747, 804; 715/509, 501, 503; 709/218; 717/106, 108, 112, 116, 122, 137, 165, 166, 164; 706/922, 45

(56) References Cited

U.S. PATENT DOCUMENTS

| 5,159,687 | A | * | 10/1992 | Richburg | 717/106 |
| 5,566,330 | A | * | 10/1996 | Sheffield | 707/4 |
| 5,752,018 | A | | 5/1998 | Sheffield | 395/602 |
| 5,832,481 | A | | 11/1998 | Sheffield | 707/4 |
| 5,864,862 | A | | 1/1999 | Kriens et al. | 707/103 |
| 6,154,128 | A | * | 11/2000 | Wookey et al. | 340/506 |
| 6,212,530 | B1 | * | 4/2001 | Kadlec | 707/201 |
| 6,285,998 | B1 | * | 9/2001 | Black et al. | 707/4 |

FOREIGN PATENT DOCUMENTS

JP 122858 A2 10/1998

OTHER PUBLICATIONS

Rosson et al., "the reuse of uses in Smalltalk programming", ACM, vol. 3, No. 3, Sep. 1996, pp. 219–253.*

(List continued on next page.)

Primary Examiner—Jean M. Corrielus
(74) Attorney, Agent, or Firm—Karna L. Nisewaner

(57) ABSTRACT

Providing economical interconnectivity between application programs and database content is obviated by the described database management system interface. The system of the invention includes at least one database server that serves disparate database clients through an object-oriented interface. This object-oriented interface has classes including a database access class and methods within the database access class to implement the interface, define other methods, and create and manage database connections. There is at least one object within the database access class that retrieves database properties, and creates an object from the contained properties needed to establish a connection to the database. The class also contains a connection manager method to instantiate the interface, create a connection to the database, and thereafter call methods within the database access class to access database content, execute database queries on the database content, and disconnect from database content.

22 Claims, 11 Drawing Sheets

OTHER PUBLICATIONS

Lucy Berlin, "when objects collide: experiences with reusing multiple class hierarchies", ACM, Oct. 21–25, 1990.*

Sacitha Srinivasan et al., "Object oriented Reuse: Experience in developing a framework for speech recognition applications", IEEE, 1998.*

Fowler et al., "Principle for writing reusable libraries", ACM, pp. 150–159.*

Steyaert et al., "Reuse contracts: Managing the evolution of reusable assets", ACM, 1996.*

Towell, E. R. et al.; "Implementation of an Interface to Multiple Databases", *Journal of Database Management, Spring 1995*, pp 13–21.

Seriai A; Oussalah C; "Queryaid: a query formulation model for and by reuse", *Proceedings of the First International Conference on Web Information Systems Engineering*, Hong Kong, China, 19–21 Jun. 2000, vol. 1, pp 246–253.

Keahey K; Beckman P; Ahrens J; "Ligature: component architecture for high performance applications.", *International Journal of High Performance Computing Applications*, vol. 14, No. 4, pp. 347–356, Winter 2000.

IBM Technical Disclosure Bulletin, " Self–Contained Reusable Programmed Componentss", vol. 38, No. 07, Jul. 1995, pp. 283–285.

* cited by examiner

REUSABLE DATABASE ACCESS COMPONENT

FIELD OF THE INVENTION

The invention relates methods for converting an external access to a database or files into internal access to the database or files, and conversion of an external query format into an intermediate or internal query format.

BACKGROUND

The invention pertains to the way applications/clients access database resources. Generally, application programs, as data mining applications, customer relationship applications, order entry applications, inventory management applications, account management applications, and the like, referred to herein as "clients" and "applications", access databases through an application specific interface. This means that on most projects, given real world pressures to complete the interface early, under budget, and with zero defects, for "24 by 7" availability, an individual or team is tasked with creating an interface that is specific to the application program and the database management system. While developers may use software developer kits to accomplish this task, the result may not be a "reusable interface," just code snippets and "lessons learned" that can be applied to the next interface project.

Many application programs have their own application program specific version of a database access component. However, these application program specific versions of access components, while capable of being installed on many different database management systems, utilize installation wizards, installation dialog boxes, and the like that, in effect "hard wire" or "hard code" the interface to a specific application program—database management system pair after installation. The resulting interface components abstract database management system specific information into a class/utility that "uses" the component. As such, they lack the ability to switch between accesses by different application programs.

SUMMARY OF THE INVENTION

The problem of providing economical interconnectivity between application programs and database content is significantly obviated by the method, system, and program product described herein.

The database management system of the invention includes an object oriented interface and is synergistically paired with either (1) at least one database server adapted to serve a plurality of disparate database clients, or (2) at least one client adapted to be served by a plurality of servers, or (3) a plurality of servers serving a plurality of clients, all through the object oriented interface described herein. This object oriented interface comprises classes including a database access class, objects, and methods within the database access class to implement the interface, define methods within the class, and create and manage database connections in accordance with the method of the invention. There is at least one object within the database access class that is adapted to retrieve database properties, and create an object based upon these properties to establish a connection to the database. The class also contains a connection manager method to instantiate the interface, create a connection to the database, and thereafter call other methods within the database access class to access database content, execute database queries on the database content, and disconnect from database content.

The program product is in the form of computer readable computer code residing on one or more storage media. The storage media may be distribution media or may be database or application servers or database clients on one or more computers or one or more systems on one computer platforms. The storage media may be distribution media (in which case the executable code may be one or both of encrypted and compressed and may require extraction, decryption, or installation to be executable) or operational storage (as RAM, ROM, hard drive, tape drive, or the like).

The computer readable computer code, once rendered executable, connects application and database management system programs to configure and control an interface program between the application program and the database management system, in accordance with the method of the invention. The program product includes code to provide an object oriented interface between the database and the application program. The object-oriented interface contains classes, including at least one database access class. The interface code contains methods and objects to implement the interface, define methods, and create and manage database connections. It also contains code for accessing the database from the application program through the object oriented interface. The data access class also contains code for retrieving database properties, and creating within the database access class a first object containing properties needed to establish a connection to the database, and a second, connection manager object to instantiate the interface and create a connection to the database, and to thereafter call methods within the database access class to access database content, execute database queries, disconnect from database content.

The classes, methods, and objects within the database access class include application program specific connection managers to manage connections between application programs and the database through the interface.

When the object oriented interface is programmed in the Java language, and the classes and methods comprise application program specific connection managers to manage connections between an application program and a database, the DbAccess class will typically comprise one or more members, such as the members shown in the FIGURES and Appendices. These include one of ThinConnection, WebSphereConnection, WebLogicConnection, WebLogicJndiConnection, or WebLogicRmiConnection methods and classes to manage connections. Also included is a ProjectDatabaseAccess method to retrieve database property information and to create a DbPropertyBean containing properties needed to make connection to the database, and to create an SmDatabaseManager to a ConnectionDispenser object to make the connection to the database. Other included Java programming language methods, such as the getNewConnection, and setProperties methods use DbPropertyBean to retrieve and apply database properties.

In a preferred embodiment, the invention solves the problem of interconnectivity by using an interface method called a ConnectionDispenser. Classes, methods, and other objects that implement this interface provide an implementation that "knows how" to lookup a connection from the database. The higher level components like DbAccess can then operate strictly on the interface. This enables DbAccess to do common database functions without knowledge of where the connection is coming from (i.e. direct connections, Weblogic Server, WebSphere Application Server, etc).

THE FIGURES

Various aspects of the method, system, and program product of the invention are illustrated in the FIGURES.

FIG. 1 is a high level overview of a database access interface according to the invention, with the interface, including a database access class and a connection dispenser method, as well as other objects, methods, and utilities contained within the database access class. The interface is between application clients and a database management system with database servers.

FIG. 2 is a more detailed view of the system of FIG. 1 showing application clients, the interface, and a database server. The interface is illustrated with objects, illustrated by a DatabaseManager (realized by SmDatabaseManager in the code), AdvancedDbAccess, DbAccess, DatabaseProperties (realized by DbPropertyBean in the code), ConnectionDispenser, realizations of ConnectionDispenser, and the Connection to the database server.

Note that FIGS. 3 through 10 are numbered such that FIGS. 3 and 4 only are internally consistently numbered, FIGS. 5 and 6 only are internally consistently numbered, FIGS. 7 and 8 are internally consistently numbered, and FIGS. 9 and 10 are internally consistently numbered. However FIGS. 3 and 4, FIGS. 5 and 6, FIGS. 7 and 8, and FIGS. 9 and 10 are independently numbered.

Figure 9:
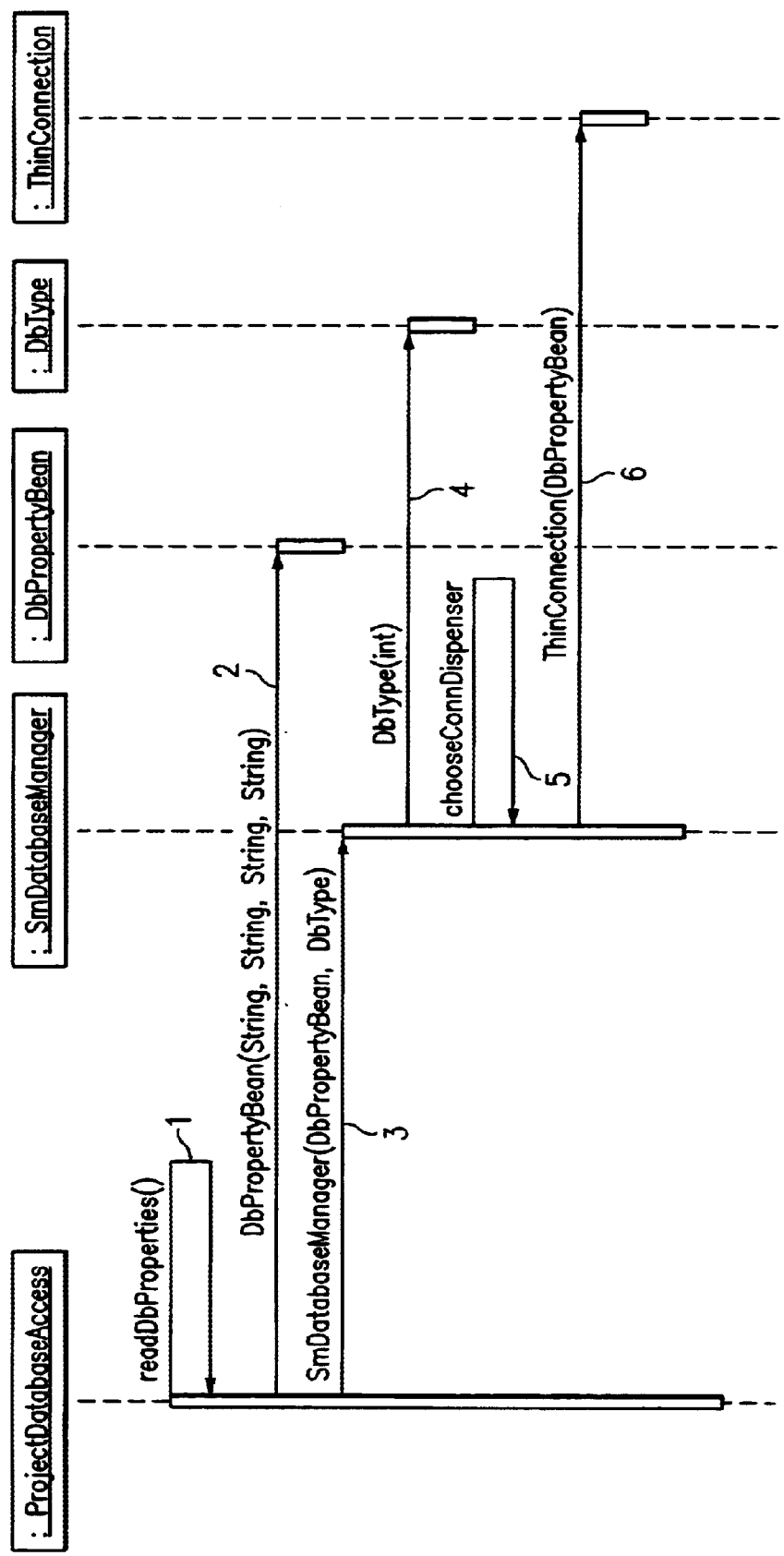

FIG. 9 illustrates the sequence of calls and events during the initialization process. The ProjectDatabaseAccess object retrieves database property information by first creating a DbPropertyBean, and an SmDatabaseManager. The SmDatabaseManager in turn selects ConnectionDispenser and creates a thin connection (simple connection) to a database.

Figure 10:
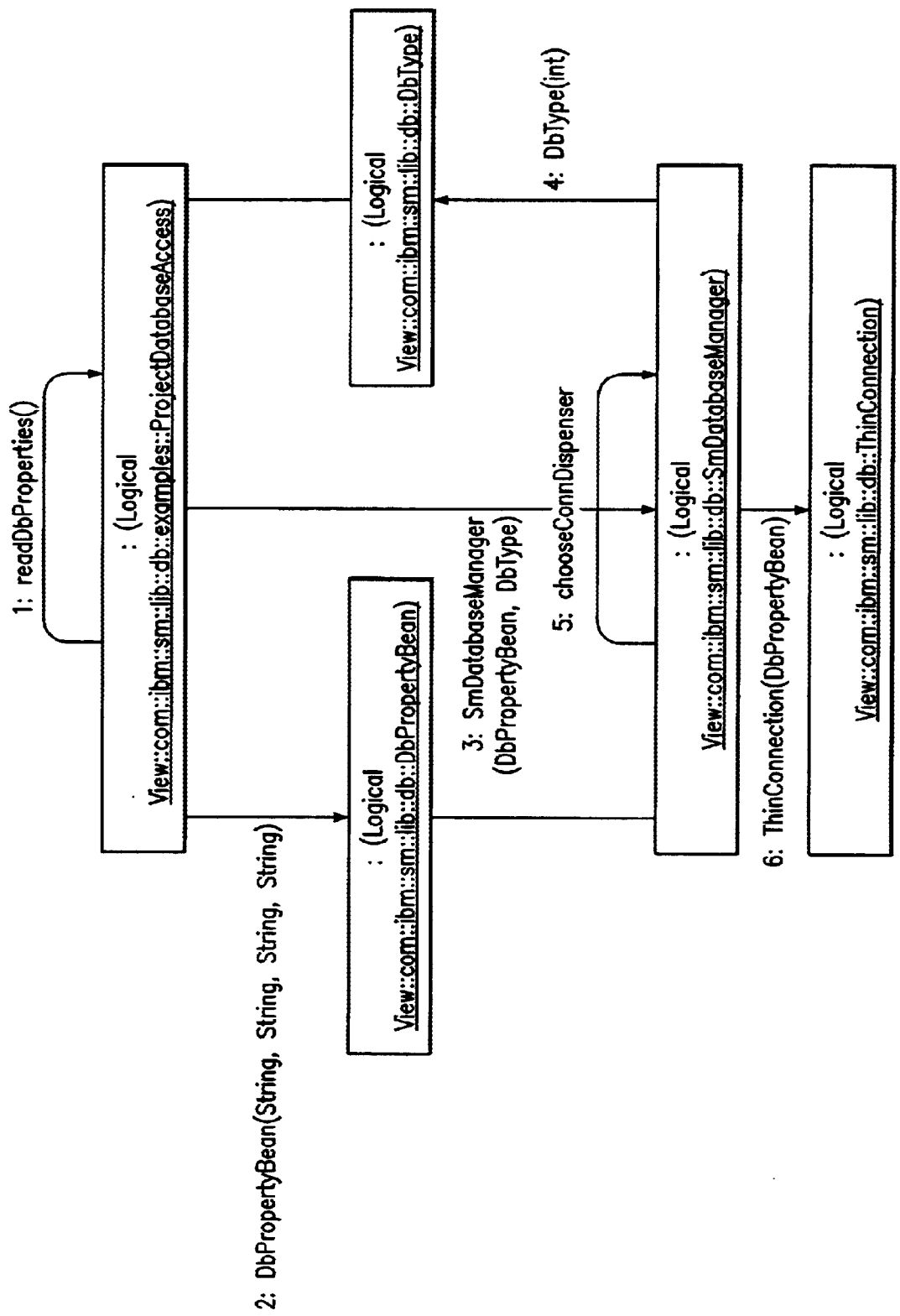

FIG. 10 is the collaboration diagram of the FIG. 9 showing the objects, the sequences in which they are called, and the calling and called objects.

Figure 11:
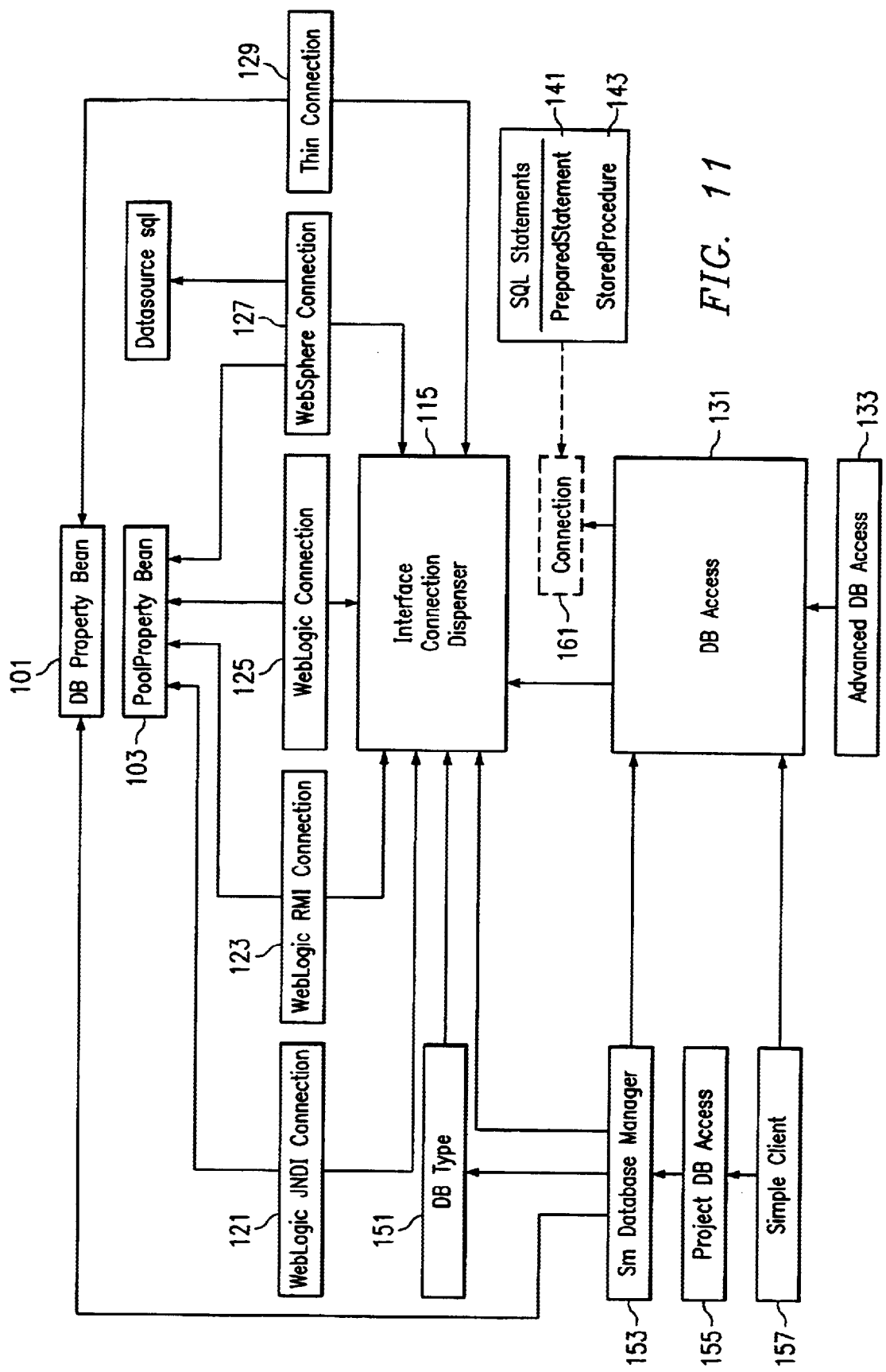

FIG. 11 is a class diagram of the classes that have been realized this design.

DETAILED DESCRIPTION OF THE INVENTION

The Database Interface and Object Oriented Programming.

The method, system, and program disclosed herein utilize Object Oriented Programming. Object-Oriented Programming (OOP) is organized around "objects" rather than "actions," and "data" rather than "logic." The Object Oriented Programming paradigm is built on Objects, Classes, Methods, and Messages, and has such characteristics as Data Encapsulation and Inheritance.

An "object" is a software "packet" containing data elements and procedures ("methods") for operating on the data elements. The data within an object can only be accessed by the methods within the object; this is "Data Encapsulation." Data encapsulation protects data from corruption by other objects and hides low level implementation details from the rest of the program.

Objects communicate with one another through "messages." A message is the name of the receiving object with (typically concatenated) with the name of one of its methods. A message is a request for the receiving object to carry out the indicated method and return the result of that action. In the Java programming language a message to the method Query to execute a query with the data "string" is represented as executeQuery(string), while in the C++ programming language the message would be Query.Execute (string).

The object oriented programming paradigm supports the repeated use of common object type through the use of "classes." A "class" is a general prototype, which describes the characteristics of similar objects, such as the connection objects WebLogicJndiConnection, WebLogicRMIConnection, WebLogicConnection, and ThinConnection. The objects belonging to a particular class are called "instances" of the class.

Through the process of "inheritance" all of the members of class can make use of the methods and variables of the class.

The first step in OOP is to identify all of the objects to be manipulated and how they relate to each other, an exercise often known as data modeling. Once an object is identified, it can be generalized to a class of objects generally sharing a common structure and behavior, with the kind of data it contains defined, and any logic sequences that can manipulate it also defined. Each distinct logic sequence is known as a method. A real instance of a class is called an "object" or, in some environments, an "instance of a class." The object or class instance is what is run in the computer. Its methods provide computer instructions and the class object characteristics provide relevant data. The user (that is other systems or programs) communicates with objects—and the objects communicate with each other—through well-defined interfaces called messages.

The concepts and rules used in object-oriented programming provide these important benefits: First, the concept of a data class makes it possible to define subclasses of data objects that share some or all of the main class characteristics. Called inheritance, this property of OOP forces a more thorough data analysis, reduces development time, and ensures more accurate coding. Second, a class defines only the data it needs to be concerned with when an instance of that class (an object) is run. That is, the code will not be able to accidentally access other program data. This characteristic of data hiding provides greater system security and avoids unintended data corruption. Third, the definition of a class is reusable not only by the program for which it is initially created but also by other object-oriented projects.

Fourth, the concept of data classes allows a programmer to create any new data type that is not already defined in the language itself.

Exemplary object oriented programming languages include Smalltalk, Simula, Modula-2, C++ and Java. The method, system, and program product described herein may be implemented in various object oriented programming languages, such as Java, Smalltalk, Simula, Modula-2, C++, and the like, as well as other languages that exhibit some of the behavior of object oriented languages and can support some object oriented constructs, for example, LISP.

The method, system, and program product described herein implement the tools and methods of OOP to provide interfaces having classes for database connectivity between application programs and database management systems. This entails the providing of simple and pooled connections to a database and to different types of application servers. As an OOP construct, a defining class, here called DbAccess, provides templates for methods to execute database operations, with the relevant classes, objects, methods, and containers contained within the defining class, inheriting properties from it, and using encapsulated variables and processes, that is, private variables and private processes.

Component Description.

Figure 1:
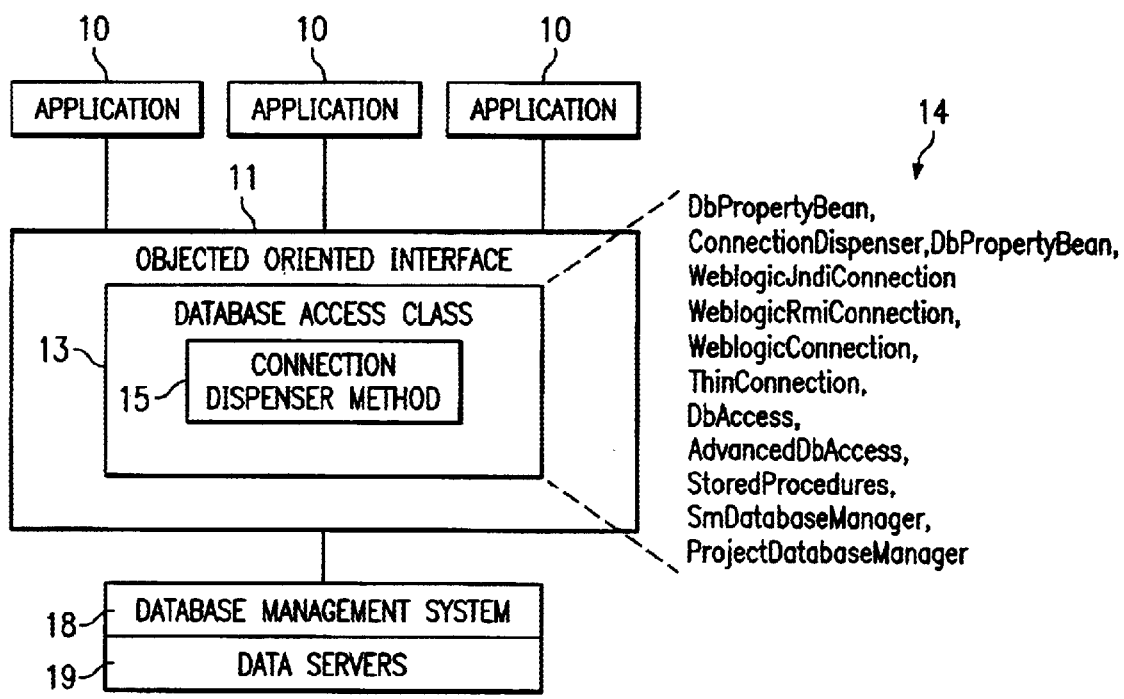
Figure 2:
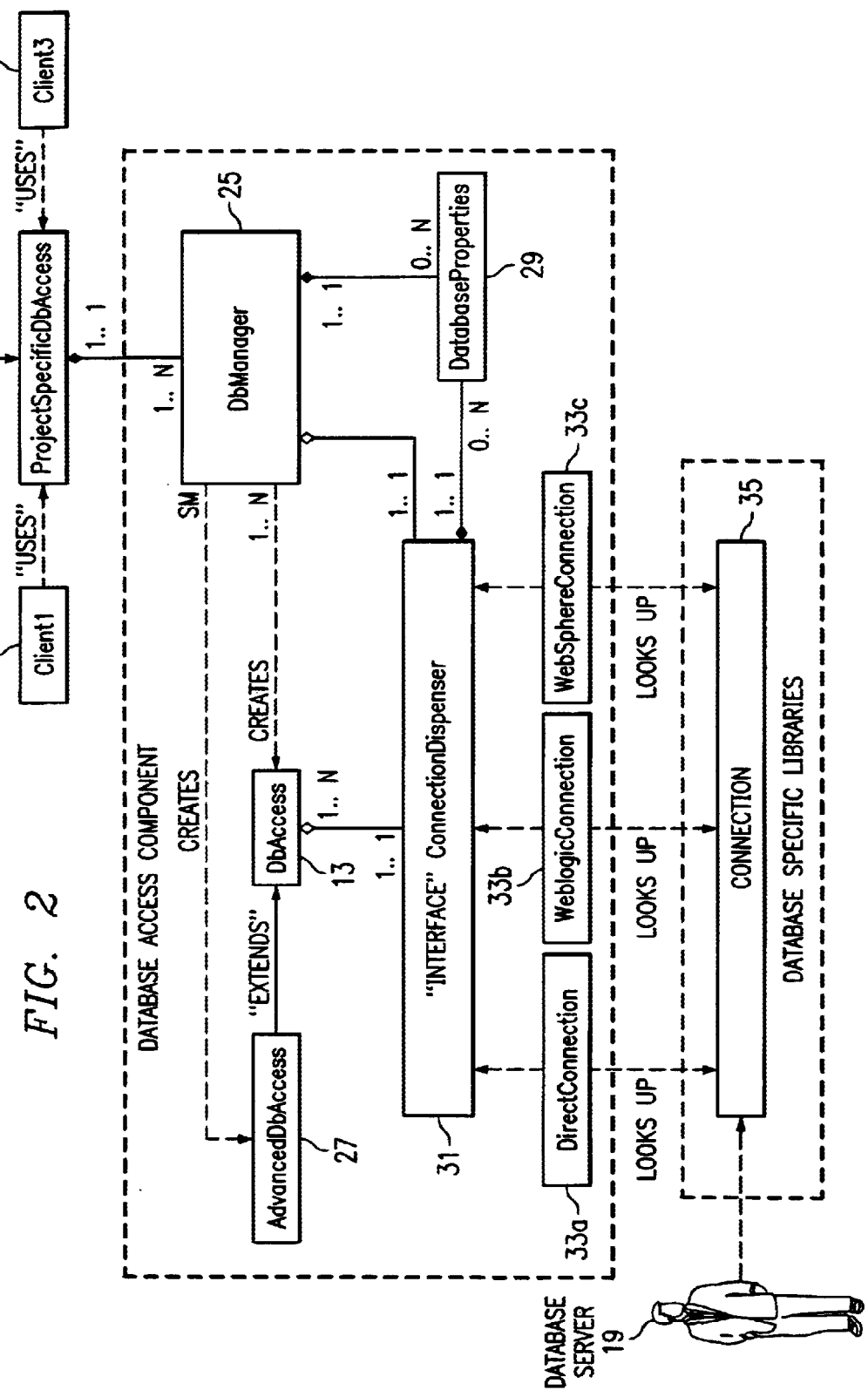

FIGS. 1 and 2 show, at a high level and at a more detailed level, the various objects of the object oriented database interface within the DbAccess class.

FIG. 1 is a high level overview of a database access interface according to the invention, with the interface, 11, including a database access class, 13, and various objects, 14, within the class, 13, including a connection dispenser Java interface class, 15. The connection dispenser Java interface class, 15, as well as the other objects, methods, and utilities within the database access class, 13, exhibit OOP properties, including inheritance, and hiding of data and procedures. The interface, 11, is between application clients and a database management system, 18, with database servers, 17.

FIG. 2 is a more detailed view of the system of FIG. 1 showing application clients, and the interface and a database server. The interface is illustrated with the DbAccess Class, 13, and objects, SmDatabaseManager, 25, AdvancedDbAccess, 27, DbPropertyBean, 29, ConnectionDispenser, 31, exemplary connections, calls, and data passing between objects, and the Connection, 35, to the database server.

DbAccess uses the tools and methods of OOP to provide interfaces and classes for database connectivity. This entails the providing simple and pooled connection to a database, including different types of databases (i.e. IBM's DB2 UDB), and to different types of application servers (i.e. IBM's WebSphere Application Server). As an OOP construct, DbAccess provides templates for executeQuery and executeUpdate through DbAccess (no direct access to java.sql.Connection), as well as direct access to a java.sql.Connection through AdvancedDbAccess. DbAccess also provides wrappers to execute PreparedStatement and Stored Procedures through AdvancedDbAccess (without directly accessing java.sql.Connection).

The clients of DbAccess are other software components, specifically Java programming language applications, including servers and daemons. Pooled connections can be utilized to provide faster access to a database with less lookups through JNDI or RMI calls.

Implementation Approach.

DbAccess is implemented in the Java programming language as a Java package. It permits Java developers to implement simple commands to implement the portions they want to use. FIGS. 3 through 10 illustrate the order of object execution and the specific sequences of calls and data transfers from object to object. Appendix 1, Code Samples, illustrates the coded objects within the DbAccess Class. Appendix 2, Classes, is a summary of the class members within the DbAccess Class.

The object oriented DbAccess class and its members facilitate simple connections (thin connections). Simple connections provide quick access to database without worrying about complexities involved in maintaining pooled connection, and do not require a complex application server, such as IBM WebSphere Application Server.

However, the simple connection is not the only connection provided. A more powerful connection object is also provided because there are disadvantages with simple connections to a database. For example, creating a connection is an expensive operation, and the connection cannot be reused once it is closed. Moreover, if the application fails to close the connection, then it remains unclosed and cannot be reused. Additionally, if the maximum connections limit is reached, no more connections can be opened until the database is restarted and forces outstanding connections to be terminated.

The DbAccess Framework (DbAccess) addresses the shortcomings of the simple connection. DbAccess is simple to use and has two main connection features: DbAccess (no direct access to the connection) and AdvancedDbAccess (direct access to the connection and can use PreparedStatement and Stored Procedures).

Figure 3:
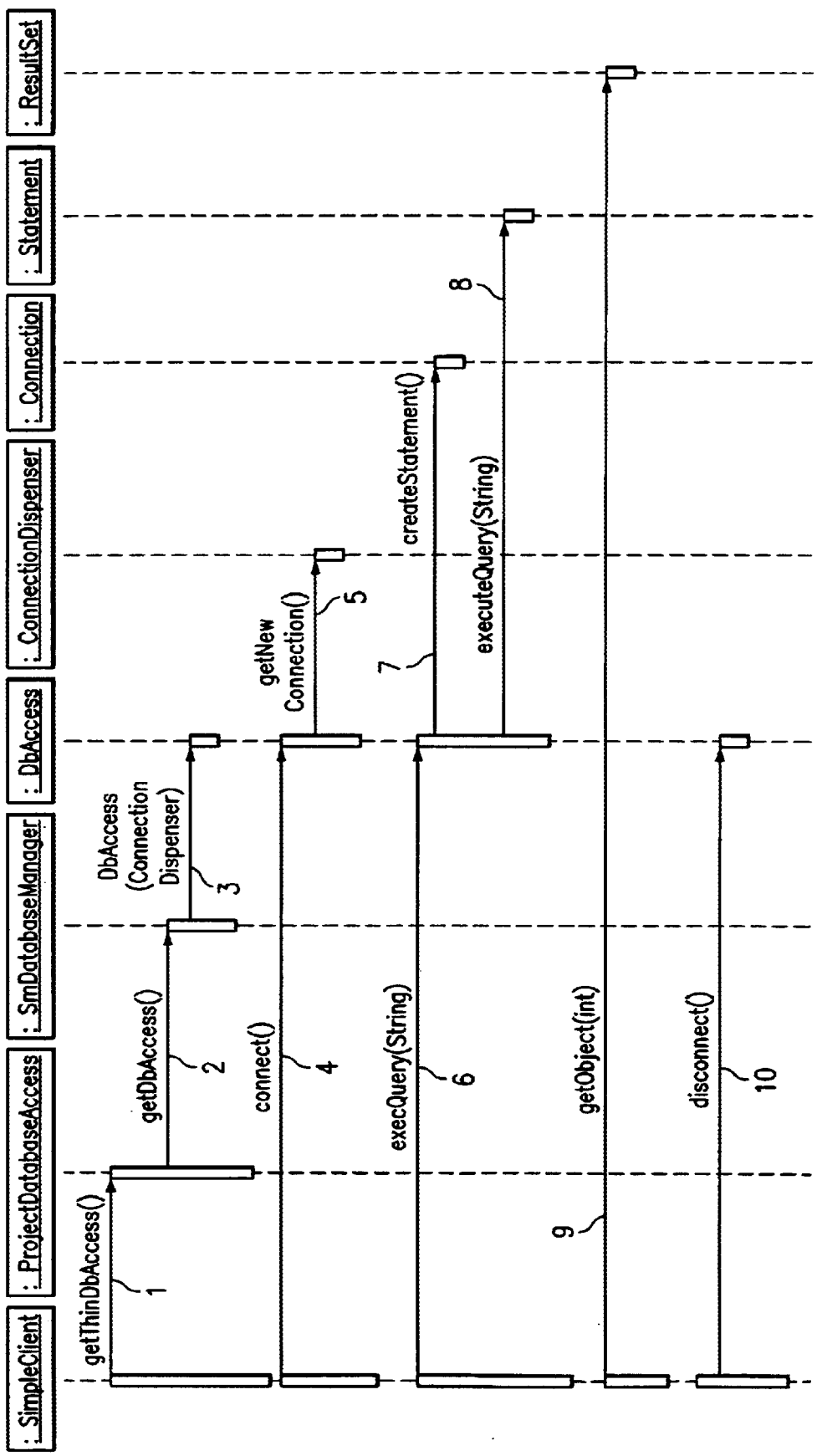
FIG. 3 illustrates the sequence of calls and events when a simple client requests a thin connection (simple connection) to database, and a SmDatabaseManager object provides a DbAccess object for the client to use. The simple client executes queries and updates through methods provided by the DbAccess object.
Figure 4:
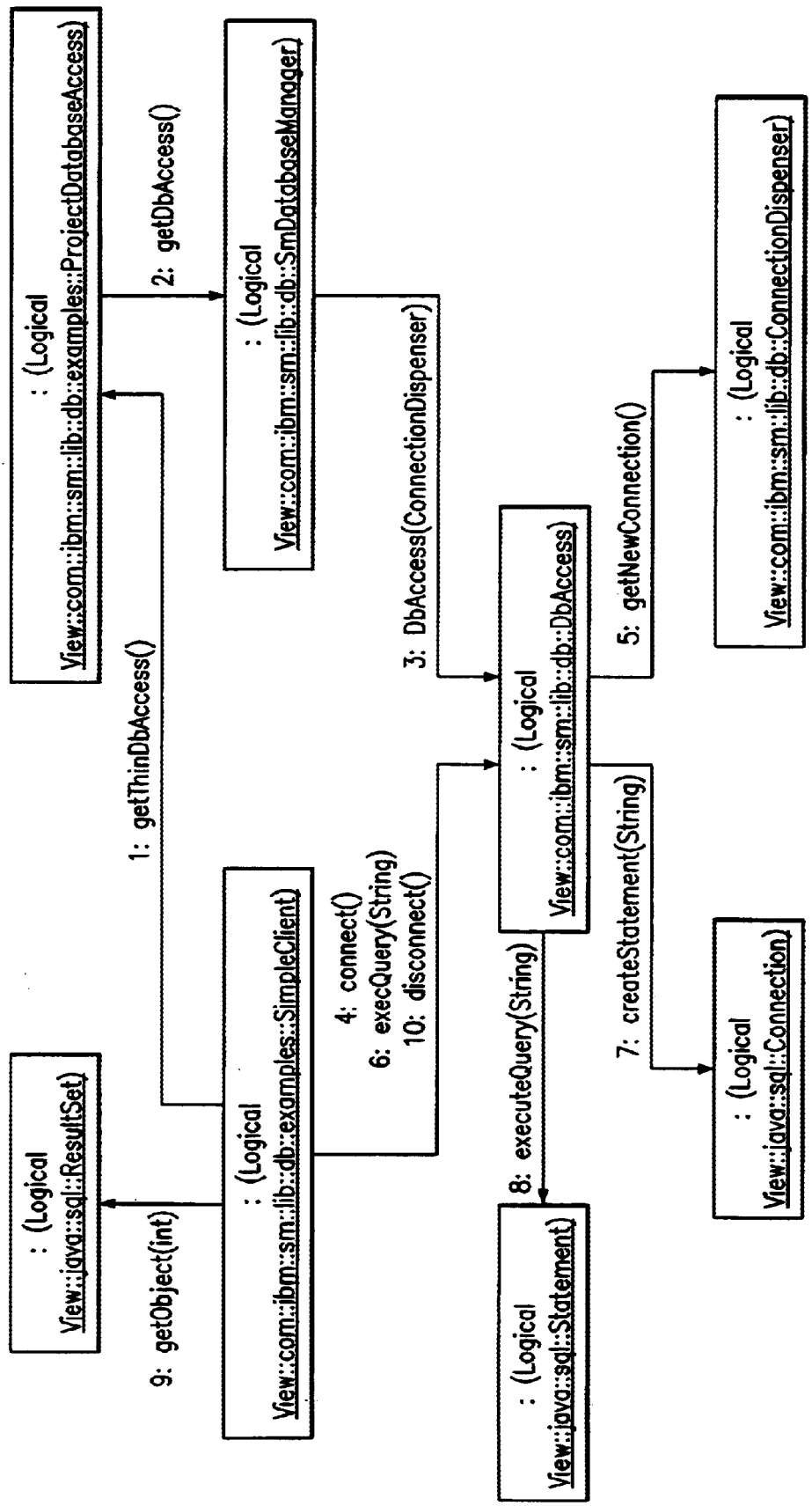
FIG. 4 is the collaboration diagram of the FIG. 3 showing the objects, the sequences in which they are called, and the calling and called objects.

FIG. 3 illustrates the sequence of calls and events when a simple client requests a thin connection (simple connection) to database, and the SmDatabaseManager provides a DbAccess object for the client to use to effect the thin connection. The simple client will not have direct access to the thin connection; rather, the simple client can execute queries and updates through methods provided by the DbAccess. The simple client must issue connect( ) to invoke and disconnect( ) to properly close connection within the DbAccess. FIG. 4 is the collaboration diagram of the sequences shown in FIG. 3 showing the objects, the sequences in which they are called, and the calling and called objects.

As shown in FIG. 3 and FIG. 4, SimpleClient issues getThinDBAccess, 1, to ProjectDbAccess, which issues getDbAccess( ), 2, to SmDatabaseManager. SmDatabaseManager creates a new DbAccess using the DbAccess (ConnectionDispenser), 3, constructor as SimpleClient issues connect( ), 4, to DbAccess. DbAccess issues getNewConnection, 5, to ConnectionDispenser as SimpleClient issues execQuery(String), 6, to DbAccess. Next, DbAccess issues createStatement, 7, to Connection. DbAccess then issues executeQuery(string), 8, to Statement, SimpleClient then issues getobject( ), 9, to ResultSet and disconnect( ), 10, to DbAccess.

Figure 5:
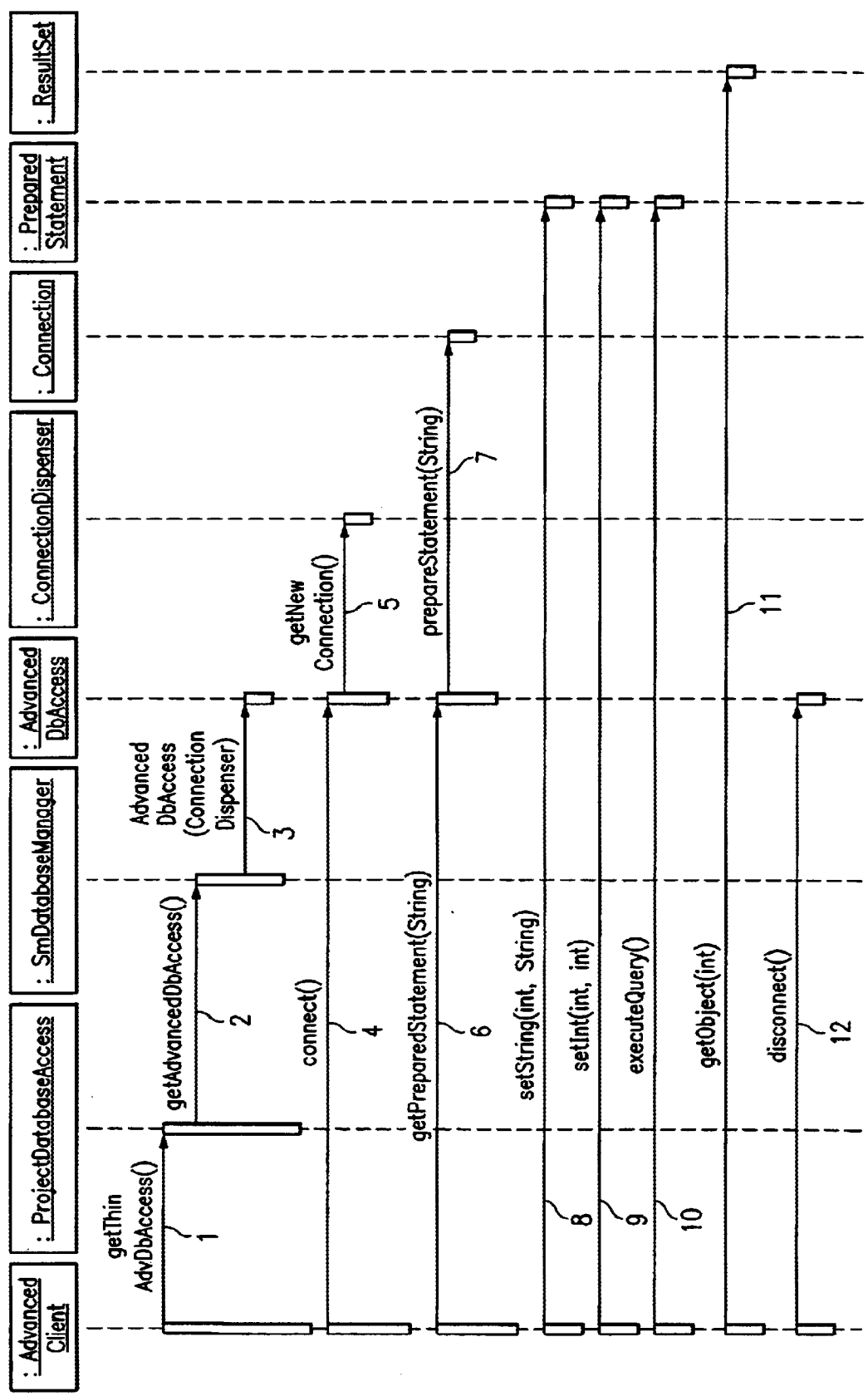
FIG. 5 illustrates the sequence of calls and events when an advanced client requests to use a PreparedStatement using a thin connection (simple connection) to a database, and the SmDatabaseManager provides an AdvancedDbAccess object for the client to use.
Figure 6:
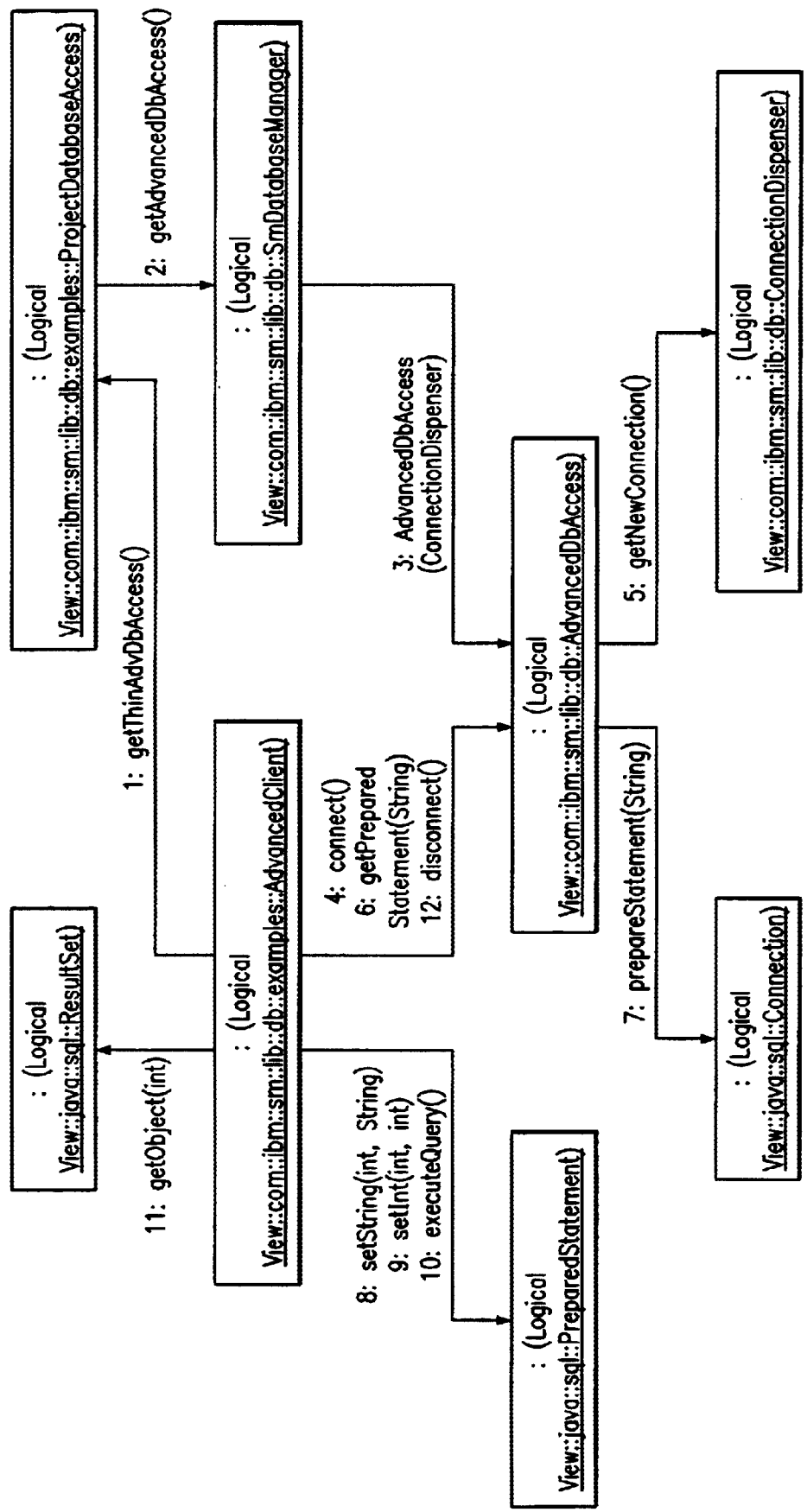
FIG. 6 is the collaboration diagram of the FIG. 5 showing the objects, the sequences in which they are called, and the calling and called objects.

FIG. 5 illustrates the sequence of calls and events when an advanced client requests a thin connection (simple connection) to a database, and the SmDatabaseManager provides an AdvancedDbAccess object for the client to use. The advanced client uses PreparedStatement to execute query or update. The advanced client can have access to the connection, but can also use methods provided by AdvancedDbAccess. This advanced client issues connect( ) to invoke and disconnect( ) to properly close connection in AdvancedDbAccess. FIG. 6 is the collaboration diagram of the FIG. 5 showing the objects, the sequences in which they are called, and the calling and called objects.

As shown in FIG. 5 and FIG. 6, AdvancedClient issues a getThinAdvDbAccess( ), 1, to ProjectDatabaseAccess. ProjectDbAccess then issues getAdvancedDbAccess( ), 2, to SmDatabaseManager. SmDatabaseManager passes AdvancedDbAccess(ConnectionDispenser), 3, to ConnectionDispenser. It is then returned to AdvancedClient which issues connect( ), 4, to AdvancedDbAccess. AdvancedDbAccess then issues getNewConnection( ), 5, to ConnectionDispenser, then receives getPreparedStatement( ), 6, from AdvancedClient and issues PreparedStatement(String), 7, to Connection, AdvancedClient issues setString(int, String), 8, setInt(int, int), 9, and finally executeQuery( ), 10, to PreparedStatement. AdvancedClient issues getobject, 11 to ResultSet to iterate through the table and send disconnect( ), 12, from to AdvancedClient when it is complete. This ends the query.

Figure 7:
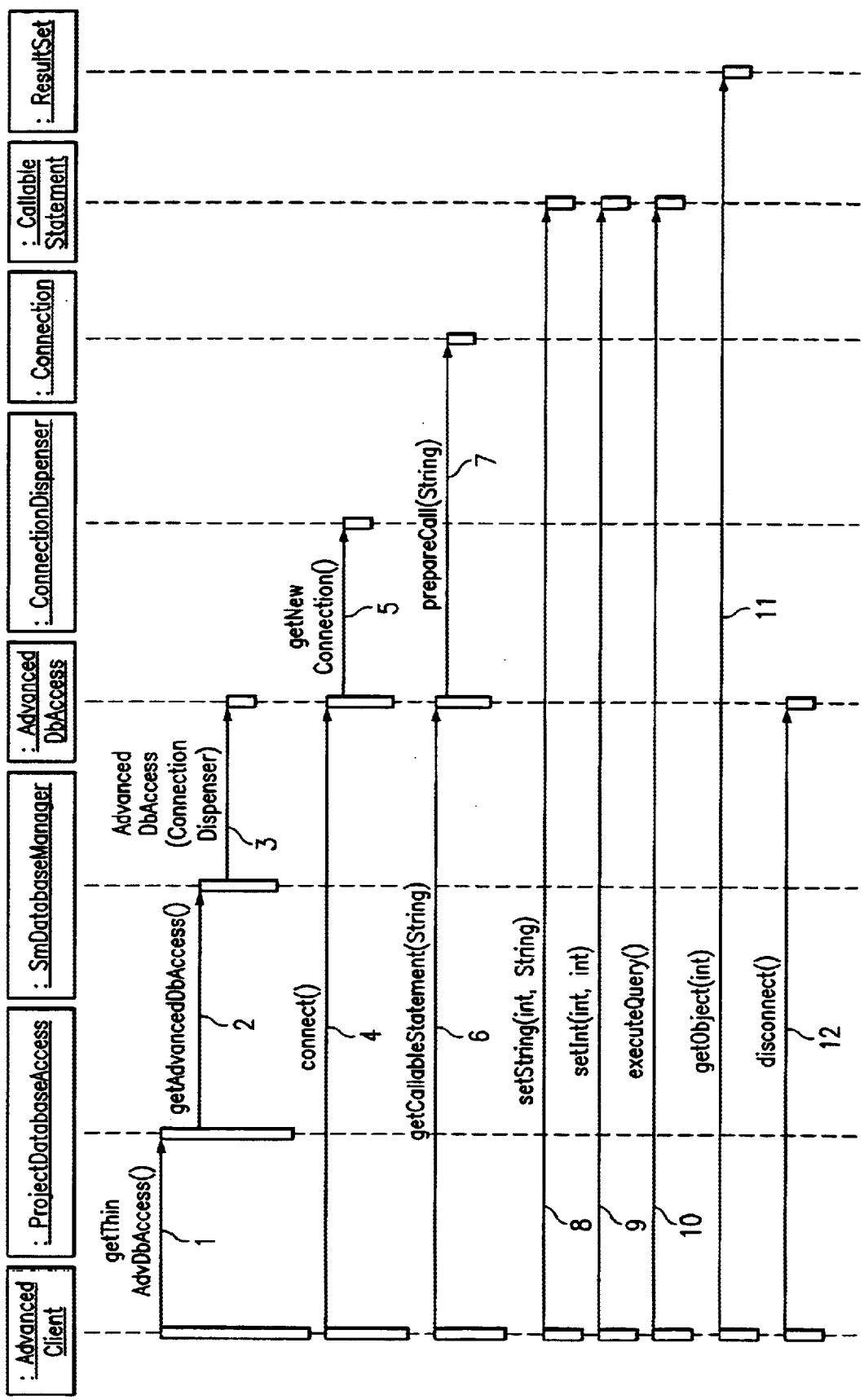
FIG. 7 illustrates the sequence of calls and events when an advanced client requests to use a CallableStatement (to execute a Stored Procedure) using a thin connection (simple connection) to a database, and the SmDatabaseManager provides an AdvancedDbAccess object for the client to use.

FIG. 7 illustrates the sequence of calls and events when an advanced client requests a thin connection (simple connection) to a database, and the SmDatabaseManager provides an AdvancedDbAccess object of the DbAccess Class for the client to use. The advanced client uses Stored Procedure to execute query or update. The advanced client can have access to the connection, but can also use methods provided by the AdvancedDbAccess.

Figure 8:
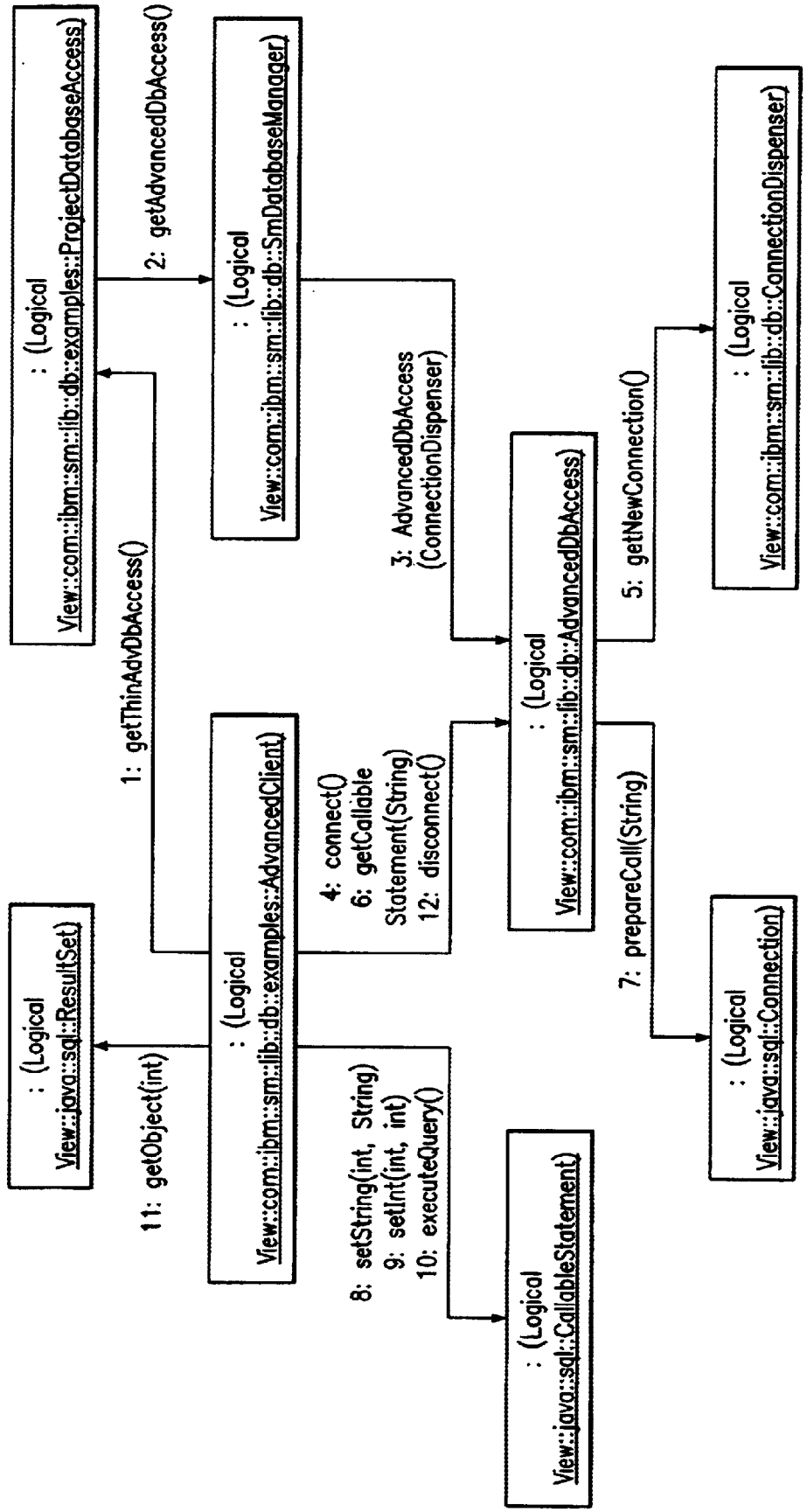
FIG. 8 is the collaboration diagram of the FIG. 7 showing the objects, the sequences in which they are called, and the calling and called objects.

This advanced client issues connect( ) to invoke and disconnect( ) to properly close connection in AdvancedDbAccess. FIG. 8 is the collaboration diagram of the FIG. 7 showing the objects, the sequences in which they are called, and the calling and called objects.

As shown in FIG. 7 and FIG. 8, AdvancedClient issues getThinAdvDbAccess( ), 1, to ProjectDatabaseAccess( ), which issues getAdvancedDbAccess, 2, to SmDatabaseManager. SmDatabaseManager creates a new AdvancedDbAccess using the AdvancedDbAccess (ConnectionDispenser), 3, constructor and AdvancedClient issues connect( ), 4, to AdvancedDbAccess. AdvancedDbAccess issues getNewConnection( ), 5, to ConnectionDispenser( ) and AdvancedClient issues getCallableStatement(String), 6, to AdvancedDbAccess. AdvancedDbAccess then issues prepareCall(String), 7, to Connection. Next, AdvancedClient issues setString(int, String), 8, setInt(int, int), 9, and executeQuery( ), 10, to CallableStatement. AdvancedClient then issues getObject (int), 11, to ResultSet and disconnect( ), 12, to AdvancedDbAccess.

FIG. 9 illustrates the sequence of calls and events for collecting and assembling system environmental data for use in the DbAccess class. This occurs when the ProjectDatabaseAccess object retrieves database property information, creates a DbPropertyBean, and creates an SmDatabaseManager. The SmDatabaseManager in turn selects ConnectionDispenser and creates a thin connection (simple connection) to a database. The SmDatabaseManager can create different types of connection for application servers. FIG. 10 is the collaboration diagram of the FIG. 9 showing the objects, the sequences in which they are called, and the calling and called objects.

FIG. 9 and FIG. 10 illustrate ProjectDatabaseAccess reading DbPropertyBean( ), 1. ProjectDatabaseAccess creates a new DbPropertyBean using the DbPropertyBean (String, String, String, String), 2, constructor, and dispatches the DbPropertyBean and DbType, 3, to SmDatabaseManager. SmDatabaseManager issues a chooseConnectionDispenser, 5, and dispatches DbType(int), 4, to DbType. SmDatabaseManager then creates a new ThinConnection object using the constructor ThinConnection(DbPropertyBean), 6.

FIG. 11 is a class diagram illustrating the entire realized design. Among other things, it shows the DbPropertyBean, 101, in relation to other members of the DbAccess Class, including ConnectionDispenser, 115. The DbPropertyBean, 101, is a simple data object that contains, as a repository, all of the properties needed to make a database connection. PoolPropertyBean, 103, is a subclass of DbPropertyBean, 101, and has additional properties. These are required when creating pooled connections (to optimize performance of creating and closing connection) to a database. ConnectionDispenser, 115, is an interface and provides abstract methods to implementation classes. WeblogicJndiConnection, 121, handles pooled connections to a database through JNDI (Java Naming Directory Interface) lookup. WeblogicRmiConnection, 123, handles pooled connections to database through RMI (Remote Method Invocation). WeblogicConnection, 125, handles pooled connections to database by creating a set of thin connections and manage them. WebSphereConnection, 127, handles pooled connections to database through JNDI lookup. ThinConnection, 129, provides methods to obtain simple connections to a database.

DbAccess, 131, prohibits clients from obtaining direct connections to database. The clients can execute queries and updates through its methods. AdvancedDbAccess, 133, is a subclass of DbAccess, 131, and provides clients to obtain direct connections to database. The client can use Stored Procedures, 143, and PreparedStatement, 141, in addition.

DbType, 151, lists the types of connection classes. If a anew ConnectionDispenser class is created, DbType, 151, needs to be modified to include the new class. SmDatabaseManager, 153, is a helper class that can be modified by the developer. ProjectDbAccess, 155, is an example of how a developer would implement a class that contains a SmDatabaseManager, 153. The ProjectDbAccess, 155, class has the role of holding and keeping a reference to one or more SmDatabaseManagers, 153, and logging to the appropriate format dictated by the project. DbType, 151, SmDatabaseManager, 153, and ProjectDbAccess, 155, can be modified or replaced entirely when necessary. If there is a new ConnectionDispenser, 115, realization then a new SmDatabaseManager, 153, may have to be written and that new class may contain the functionality of DbType, 151, SmDatabaseManager, 153, and ProjectDbAccess, 153.

To obtain a simple connection to a database a user would use the ThinConnection, 129, and DbAccess, 131, classes, while to obtain pooled connections to a database using a WebSphere application server, the user would use the WebSphereConnection, 127, in conjunction with DbAccess, 131, or AdvancedDbAccess, 133. To obtain a pooled connection to a database using WebLogic server and simple connection, WeblogicConnection, 125, is used in conjunction with DbAccess, 131, or AdvancedDbAccess, 133. To obtain a pooled connection to a database using WebLogic server and Remote Method Invocation, WeblogicRmiConnection, 127, is used in conjunction with DbAccess, 131, or AdvancedDbAccess, 133. To obtain a pooled connection to a database using WebLogic server and JNDI, WeblogicJndiConnection, 121, is used in conjunction with DbAccess, 131, or AdvancedDbAccess, 133. To submit simple executeQuery( ) and executeUpdate( ), DbAccess, 131, is used, and initializes with any type of ConnectionDispenser, 115. To submit queries and updates using PreparedStatement, 141, or Stored Procedure, 143, AdvancedDbAccess, 133, is used, and initialized with any type of ConnectionDispenser, 115.

Interfaces for Customization.

The interfaces make it possible to create customized Database accessors. For example, one could create a Pooled- Connection to initialize DbAccess, 131, or AdvancedDbAccess, 133, in addition to other ConnectionDispensers, 115, provided.
ConnectionDispenser.

The ConnectionDispenser, 115, is central to the interface. It is, as shown in FIG. 11, where the connection is orchestrated. ConnectionDispenser, 115, creates the connections with the tools and data provided by the other objects. The ConnectionDispenser, 115, code is shown below:

```
public interface ConnectionDispenser {
    public abstract Connection getNewConnection( ) throws
        SQLException;
    public abstract void setProperties(DbPropertyBean props)
        throws Exception;
    public abstract DbPropertyBean getProperties( );
}
```

This interface provides any object with a database connection, including set and get properties. Any objects implementing this interface must provide method definitions.
Implementation of the DbAccess Framework Classes
DbAccess.

The DbAccess, 131, contains a java.sql.Connection object as a private attribute. It performs queries, returns java.sql.ResultSet, and closes the connection for a client. Direct access to the Connection object is prohibited.
AdvancedDbAccess.

The AdvancedDbAccess, 133, is a subclass of DbAccess, 131. It provides methods to retrieve a java.sql.CallableStatement and java.sql.PreparedStatement objects, and allows access to java.sql.Connection object. The client can also access methods to execute PreparedStatement, 141, and CallableStatement, 143, objects without directly accessing the Connection, 161, object. The client must provide a ConnectionDispenser, 115, to initialize this class.
DbPropertyBean.

The DbPropertyBean, 101, contains all the properties needed to make a connection to a database. It provides different constructors to initialize only the necessary attributes a particular ConnectionDispenser, 115, object will require. This is used when thin connections are created.
PoolPropertyBean.

The PoolPropertyBean, 103, is a subclass of DbPropertyBean, 101. The additional attribute stores a DataSource name, which is required when making RMI/JNDI calls. This is used when pooled connections are created.
ConnectionDispenser.

The ConnectionDispenser, 115, is an interface which provides abstract methods to create/manage connections. A class must implement this interface and define its methods. ThinConnection, 129, WebSphereConnection, 127, WeblogicConnection, 125, WeblogicJndiConnection, 123, and WeblogicRmiConnection, 121 are illustrated and exemplary ConnectionDispenser, 115, realizations of the ConnectionDispenser interface.
DbType.

The DbType, 151, lists types of connections the DbAccess Framework can create. If a new class of ConnectionDispenser type is created, then DbType, 151, is not to be modified to include the name of the new class. Instead, a new SmDatabaseManager, 153, should be created or extended. The SmDatabaseManager, 153, and ProjectDbAccess, 155, use this class.
SmDatabaseManager.

The SmDatabaseManager, 153, is created to provide another layer of abstraction when using DbAccess Framework. DbAccess, 131, and AdvancedDbAccess, 133, can be used as-is; however, the client will need to repeat initialization steps whenever these classes are instantiated. Alternatively, the SmDatabaseManager, 153, will perform initialization only once and still provide the same accessibility to the database. This class can be used as-is, but should be modified or replaced altogether to accommodate the user's needs
ProjectDbAccess.

The ProjectDbAccess, 155, is created as an example to demonstrate how a project could use the DbAccess Framework to meet the project's specific needs. This class provides examples of how to create an SmDatabaseManager, 153, with access to a DbAccess instance. This class is only an example. Code snippets may be used from this class; however, the class should be rewritten. The ProjectDbAccess, 155, class has the role of holding and keeping a reference to one or more SmDatabaseManagers. 153, and logging to the appropriate format dictated by the project.

Appendix 1, Code Samples, illustrates code for the main program, main( ), for a simple client, 157, for the project database manager, for ProjectDatabaseAccess, and for a small database manager, SmDatabaseManager.

The SimpleClient's main method calls five different test methods. When testing, it may not be possible to test all methods at once; therefore, certain methods should be commented out. When testing an IBM WebSphere Application's database connection, wasPoolTest( ) should be run. Three of the five methods, namely rmiTest( ), jndiTest( ), and poolTest( ) are configured specific to a BEA's Weblogic server. However, thinTest( ) can be tested for any application servers and databases.

SimpleClient's main method first calls c.thinTest( ) which uses Database Driver to connect to a database. Next it uses one of c.rmiTest( ), c.jndiTest( ), c.poolTest( ), and c.wasPoolTest to test for connection to a database or for pooling. For example, SimpleClient uses c.rmiTest( ) uses RMI and c.jndiTest( ) usesJNDI to connect to a database, while c.poolTest( ) uses Weblogic's connection pooling, and c.wasPoolTest( ) uses WebSphere's connection pooling.

The thinTest( ) method creates a simple connection to a database by calling ProjectDatabaseAccess.getThinDbAccess( ). However, the connection to the database is not created until connect( ) is issued. Since getThinDbAccess( ) returns an instance of DbAccess object, direct access to the java.sql.Connection is not allowed. Therefore, DbAccess's execQuery( ) method is used to execute a query.

The wasPoolTest( ) method creates a pooled connection to a database by calling ProjectDatabaseAccess.getWasPooledDbAccess( ). Since getWasPooledDbAccess( ) returns an instance of DbAccess, direct access to java.sql.Connection is again prohibited. If direct access to java.sql.Connection is necessary or needs to execute java.sql.PreparedStatement/java.sql.StoredProcedure, then it is necessary to call ProjectDatabaseAccess.getWasPooledAdvDbAccess( ).

The rmiTest( ) method creates a connection to a database using Remote Method Invocation (RMI). This test method applies only to java clients running on the BEA's Weblogic Server. The jndiTest( ) creates a connection to a database by using Java Naming Directory Interface (JNDI). This test method also applies only to Java clients running on the BEA's Weblogic server. The poolTest( ) creates a connection to a database by using BEA Weblogic server's Weblogicjdbc.pool.Driver. This test method also applies only to java clients running on the BEA's Weblogic server.

The code used in the above code samples, and illustrated in the FIGURES utilizes the OOP artifacts described and illustrated in Appendix 2, Members of Class DbAccess. As described and illustrated in Appendix 2, these OOP artifacts facilitate the interface between the application programs and the data base management systems. APPENDIX 2, Members of Class DbAccess, illustrates the members of the class DbAccess.

DbAccess contains a java.sql.Connection object, performs queries for a client, returns a java.sql.ResultSet to the client, and closes the connection for the client. The key here is that this class contains the java.sql.Connection in a "has-a" relationship. This means that direct access to the Connection object is prohibited so that DbAccess can manage the resources contained in this class.

Clients that must utilize PreparedStatements and/or stored procedures use the AdvancedDbAccess class, as it provides access to the connection object as well as methods for accessing the PreparedStatement and CallableStatement classes.

Class DbPropertyBean is a simple data object that contains all the properties needed to make a database connection. If any additional properties are needed for some custom type of connection, then this class can be subclassed and the additional properties can be put in the subclass ConnectionDispenser is an interface that is realized by the classes ThinConnection, WeblogicConnection, WeblogicJndiConnection, WeblogicRmiConnection, and WebSphereConnection.

Through setProperties, DbPropertyBean throws java.lang.Exception and sets the properties used by the ConnectionDispenser to lookup and obtain a java.sql.Connection object. If implementers need more or different properties than that provided in the DbPropertyBean, they can subclass DbPropertyBean and pass the subclass into this method. If that is done, then when implementing this method simply cast the DbPropertyBean to the appropriate class.

GetProperties, working through the interface public DbPropertyBean getproperties( ), returns the current properties contained by the ConnectionDispenser Class AdvancedDbAccess provides methods to retrieve a java.sql.Callablestatement and java.sql.PreparedStatement objects. This class also allows access to the java.sql.Connection object; whereas, DbAccess does not. Class AdvancedDbAccess uses methods inherited from class com.ibm.sm.lib.db.DbAccess, i.e., connect, disconnect, execQuery, execUpdate, getConnectionDispenser, isConnected, setConnectionDispenser, as well as methods inherited from class java.lang.Object clone, equals, getclass, hashCode, notify, notifyAll, toString, and wait.

Class DbType contains the types of Connections possible. Instead of type-checking and using and int or String, we limit the number of possibilities by type-checking using DbType objects.

Class SmDatabaseManager is the class that should be contained to interface with the rest of the database access component. The purpose of this class is simple: to provide an easy access to the rest of the component. The component really is not difficult to use, but to make it even easier (for applications that do not need any customization) this class was created to bring all the pieces together.

If SmDatabaseManager does not in someway fulfill the needs of the implementer, then a project-specific DatabaseManager can be written. If that is the case then the need for another class to contain this project-specific class would be minimized. An implementer could easily customize the project-specific DatabaseManager instead of utilizing the SmDatabaseManager and another class to contain it.

There are two ways to instantiate this class. The first is to pass in a DbPropertyBean and a DbType object. The DbType object dictates which concrete ConnectionDispenser class to create. The second way instantiate this class is to pass in an already created ConnectionDispenser.

Once this class is created and valid, the getDbAccess method can be called to gain access to a DbAccess object that can obtain a java.sql.Connection object.

SetProperties sets the properties used by the ConnectionDispenser to lookup and obtain a java.sql.Connection object. GetProperties returns the current properties contained by the ConnectionDispenser.

Using the method, system, and program product described herein, it is possible to encapsulate database vendor specific requirements, so as to facilitate database connectivity. A further advantage is encapsulation of application server vendor specific requirements for database connectivity and management. A still further advantage of the method, system, and program product described herein is the ability to provide simple connections (thin connections) to a database, as well as pooled connections (manages creation and closure of connections) to a database.

A still further advantage is encapsulation of a java.sql.Connection instance in its simple usage (using createStatement with executeQuery and executeUpdate), and encapsulation of a java.sql.Connection instance in its complex usage (using PreparedStatement or CallableStatement with executeQuery and executeUpdate).with accessibility to a java.sql.Connection instance only through complex usage.

While the invention has been described with respect to certain preferred embodiments and exemplifications, it is not intended to limit the scope of the invention thereby, but solely by the claims appended hereto.

Express Mail Label:    38554475US

Appendix 1 – Code Samples

SimpleClient main()

```
package com.ibm.sm.lib.db.examples;

import java.util.*;
import java.sql.*;
import com.ibm.sm.lib.db.*;

public class SimpleClient
{
    public static void main(String[] args)
    {
        SimpleClient c = new SimpleClient();
        c.thinTest();         // Use Database Driver to connect to a database
        c.rmiTest();          // Use RMI to connect to a database
        c.jndiTest();         // Use JNDI to connect to a database
        c.poolTest();         // Use Weblogic's connection pooling
        c.wasPoolTest();      // Use WebSphere's connection pooling
    }
}
```

The SimpleClient's main method calls five different test methods. When testing this, it may not be possible to test all methods at once; therefore, certain methods should be commented out. When testing an IBM WebSphere Application's database connection, wasPoolTest() should be run. Three of the five methods, namely rmiTest(), jndiTest(), and poolTest() are configured specific to a BEA's Weblogic server. However, thinTest() can be tested for any application servers and databases.

Express Mail Label: 38554475US thinTest()

```java
public Hashtable thinTest()
{
    Hashtable result = new Hashtable();
    DbAccess dba = null;
    ResultSet rs = null;
    try
    {
        // get a simple connection to a database
        dba = ProjectDatabaseAccess.getThinDbAccess();
        dba.connect();
        rs = dba.execQuery("SELECT seq_id, qnum, type FROM mkb.effd_savewpc");
        while (rs.next())
        {
            int id = rs.getInt("seq_id");
            String cols[] = new String[2];
            cols[0] = rs.getString("qnum");
            cols[1] = rs.getString("type");
            result.put(new Integer(id), cols);
            System.out.println("SEQ_ID: " + id);
            System.out.println("QNUM:   " + cols[0]);
            System.out.println("TYPE:   " + cols[1]);
        }
        rs.close();
    }
    catch (Exception e)
    {
        //do some logging
        e.printStackTrace();
    }
    finally
    {
        if (dba != null)
            dba.disconnect();
        dba = null;
    }
    return result;
}
```

The thinTest() method creates a simple connection to a database by calling
ProjectDatabaseAccess.getThinDbAccess(). The connection to the database is not created until connect() is
issued. Since getThinDbAccess() returns an instance of DbAccess object, direct access to the
java.sql.Connection is not allowed. Therefore, use DbAccess's execQuery() method to execute a query.

SVL920010064US1

Express Mail Label: 38554475US wasPoolTest()

```
public Hashtable wasPoolTest()
{
    Hashtable result = new Hashtable();
    DbAccess dba = null;
    ResultSet rs = null;
    try
    {
        dba = ProjectDatabaseAccess.getWasPooledDbAccess();
        dba.connect();
        rs = dba.execQuery("SELECT seq_id, qnum, type FROM effd_savewpc");
        while (rs.next())
        {
            int id = rs.getInt("seq_id");
            String cols[] = new String[2];
            cols[0] = rs.getString("qnum");
            cols[1] = rs.getString("type");
            result.put(new Integer(id), cols);
            System.out.println("SEQ_ID: " + id);
            System.out.println("QNUM:   " + cols[0]);
            System.out.println("TYPE:   " + cols[1]);
        }
        rs.close();
    }
    catch (Exception e)
    {
        //do some logging
        e.printStackTrace();
    }
    finally
    {
        if (dba != null)
            dba.disconnect();
        dba = null;
    }
    return result;
}
```

The wasPoolTest() methods create a pooled connection to a database by calling
ProjectDatabaseAccess.getWasPooledDbAccess(). Since getWasPooledDbAccess() returns an instance of
DbAccess, direct access to java.sql.Connection is prohibited. If direct access to java.sql.Connection is
necessary or needs to execute java.sql.PreparedStatement / java.sql.StoredProcedure, then call
ProjectDatabaseAccess.getWasPooledAdvDbAccess().

SVL920010064US1

Express Mail Label:  38554475US rmiTest()

```
public Hashtable rmiTest()
{
    Hashtable result = new Hashtable();
    DbAccess dba = null;
    ResultSet rs = null;
    try
    {
        dba = ProjectDatabaseAccess.getRmiDbAccess();
        dba.connect();
        rs = dba.execQuery("SELECT seq_id, qnum, type FROM effd_savewpc");
        while (rs.next())
        {
            int id = rs.getInt("seq_id");
            String cols[] = new String[2];
            cols[0] = rs.getString("qnum");
            cols[1] = rs.getString("type");
            result.put(new Integer(id), cols);
            System.out.println("SEQ_ID: " + id);
            System.out.println("QNUM:   " + cols[0]);
            System.out.println("TYPE:   " + cols[1]);
        }
        rs.close();
    }
    catch (Exception e)
    {
        //do some logging
        e.printStackTrace();
    }
    finally
    {
        if (dba != null)
            dba.disconnect();
        dba = null;
    }
    return result;
}
```

The rmiTest() creates a connection to a database using Remote Method Invocation (RMI). This test method applies only to java clients running on the BEA's weblogic server.

SVL920010064US1

Express Mail Label: 38554475US jndiTest

```
public Hashtable jndiTest()
{
    Hashtable result = new Hashtable();
    DbAccess dba = null;
    ResultSet rs = null;
    try
    {
        dba = ProjectDatabaseAccess.getJndiDbAccess();
        dba.connect();
        rs = dba.execQuery("SELECT seq_id, qnum, type FROM effd_savewpc");
        while (rs.next())
        {
            int id = rs.getInt("seq_id");
            String cols[] = new String[2];
            cols[0] = rs.getString("qnum");
            cols[1] = rs.getString("type");
            result.put(new Integer(id), cols);
            System.out.println("SEQ_ID: " + id);
            System.out.println("QNUM:   " + cols[0]);
            System.out.println("TYPE:   " + cols[1]);
        }
        rs.close();
    }
    catch (Exception e)
    {
        //do some logging
        e.printStackTrace();
    }
    finally
    {
        if (dba != null)
            dba.disconnect();
        dba = null;
    }
    return result;
}
```

The jndiTest() creates a connection to a database by using Java Naming Directory Interface (JNDI). This test method applies only to java clients running on the BEA's weblogic server.

Express Mail Label: 38554475US

PoolTest()

```
public Hashtable poolTest()
{
    Hashtable result = new Hashtable();
    DbAccess dba = null;
    ResultSet rs = null;
    try
    {
        dba = ProjectDatabaseAccess.getPooledDbAccess();
        dba.connect();
        rs = dba.execQuery("SELECT seq_id, qnum, type FROM effd_savewpc");
        while (rs.next())
        {
            int id = rs.getInt("seq_id");
            String cols[] = new String[2];
            cols[0] = rs.getString("qnum");
            cols[1] = rs.getString("type");
            result.put(new Integer(id), cols);
            System.out.println("SEQ_ID: " + id);
            System.out.println("QNUM:   " + cols[0]);
            System.out.println("TYPE:   " + cols[1]);
        }
        rs.close();
    }
    catch (Exception e)
    {
        //do some logging
        e.printStackTrace();
    }
    finally
    {
        if (dba != null)
            dba.disconnect();
        dba = null;
    }
    return result;
}
```

The poolTest() creates a connection to a database by using BEA Weblogic server's weblogic.jdbc.pool.Driver. This test method applies only to java clients running on the BEA's weblogic server.

Express Mail Label: 38554475US

ProjectDatabaseAccess

```
package com.ibm.sm.lib.db.examples;

import com.ibm.sm.lib.db.*;

public class ProjectDatabaseAccess
{
    private static SmDatabaseManager jndiDbManager;
    private static SmDatabaseManager rmiDbManager;
    private static SmDatabaseManager pooledDbManager;
    private static SmDatabaseManager thinDbManager;
    private static SmDatabaseManager wsPooledDbManager;

static
    {
        //**THIN CONNECTION
        String user = "db2admin";
        String pass = "password";
        String url = "jdbc:db2:dev";
        String driver = "COM.ibm.db2.jdbc.app.DB2Driver";
        //Strind dsn = "";

//**POOL CONNECTION
        //String poolUser = "";
        //String poolPass = "";
        String poolUrl = "jdbc:weblogic:pool";
        String poolDriver = "weblogic.jdbc.pool.Driver";
        String poolDsn = "devpool";

//**JNDI CONNECTION
        //String jndiUser = "";
        //String jndiPass = "";
        String jndiUrl = "t3://localhost:7001";
        //String jndiDriver = "";
        String jndiDsn = "mypool";

//**RMI CONNECTION
        //String rmiUser = "";
        //String rmiPass = "";
        String rmiUrl = "t3://localhost:7001";
        String rmiDriver = "weblogic.jdbc.rmi.Driver";
        String rmiDsn = "mypool";

//**WEBSPHERE CONNECTION
        String wasUser = "db2admin";
        String wasPass = "password";
        String wasUrl = "iop:///";
        String wasDriver = "";
        String wasDsn = "jdbc/mypool";
```

SVL920010064US1

Express Mail Label: 38554475US

```
    // assume variables are populated
    DbPropertyBean thinProps = new DbPropertyBean(user, pass, url, driver);
    DbPropertyBean pooledProps = new PoolPropertyBean(poolUrl, poolDriver, poolDsn);
    DbPropertyBean jndiProps = new PoolPropertyBean(jndiUrl, jndiDsn);
    DbPropertyBean rmiProps = new PoolPropertyBean(rmiUrl, rmiDriver, rmiDsn);
    DbPropertyBean wasProps = new PoolPropertyBean(wasUser, wasPass, wasUrl, wasDriver, wasDsn);

try
    {
        pooledDbManager = new SmDatabaseManager(pooledProps, DbType.WEBLOGIC_POOL);
        thinDbManager = new SmDatabaseManager(thinProps, DbType.THIN);
        rmiDbManager = new SmDatabaseManager(rmiProps, DbType.WEBLOGIC_RMI);
        jndiDbManager = new SmDatabaseManager(jndiProps, DbType.WEBLOGIC_JNDI);
        wsPooledDbManager = new SmDatabaseManager(wasProps, DbType.WEBSPHERE_POOL);
    }
    catch (Exception e)
    {
        //log exception in format dictated by the project
        e.printStackTrace();
    }
} public static DbAccess getThinDbAccess()
{
    try
    {
        return thinDbManager.getDbAccess();
    }
    catch (Exception e)
    {
        //log in the appropriate format dictated by the project
        e.printStackTrace();
    }
    return null;
} public static DbAccess getPooledDbAccess()
{
    try
    {
        return pooledDbManager.getDbAccess();
    }
    catch (Exception e)
    {
        //log in the appropriate format dictated by the project
        e.printStackTrace();
    }
    return null;
}
```

Express Mail Label: 38554475US

```
public static DbAccess getNewThinConnection(String user,
  String pass, String url, String driver)
{
    try
    {
        DbPropertyBean tmpProps = new DbPropertyBean(user, pass, url, driver);
        SmDatabaseManager thinMngr = new SmDatabaseManager(tmpProps, DbType.THIN);
        return thinMngr.getDbAccess();
    }
    catch (Exception e)
    {
        //log in the appropriate format dictated by the project
        e.printStackTrace();
    }
    return null;
} public static DbAccess getJndiDbAccess()
{
    try
    {
        return jndiDbManager.getDbAccess();
    }
    catch (Exception e)
    {
        //log in the appropriate format dictated by the project
        e.printStackTrace();
    }
    return null;
} public static AdvancedDbAccess getPooledAdvDbAccess()
{
    try
    {
        return pooledDbManager.getAdvancedDbAccess();
    }
    catch (Exception e)
    {
        //log in the appropriate format dictated by the project
        e.printStackTrace();
    }
    return null;
}
```

Express Mail Label: . 38554475US

```
    public static DbAccess getRmiDbAccess()
    {
        try
        {
            return rmiDbManager.getDbAccess();
        }
        catch (Exception e)
        {
            //log in the appropriate format dictated by the project
            e.printStackTrace();
        }
        return null;
    } public static AdvancedDbAccess getThinAdvDbAccess()
    {
        try
        {
            return thinDbManager.getAdvancedDbAccess();
        }
        catch (Exception e)
        {
            //log in the appropriate format dictated by the project
            e.printStackTrace();
        }
        return null;
    } public static AdvancedDbAccess getWasPooledAdvDbAccess()
    {
        try
        {
            return wsPooledDbManager.getAdvancedDbAccess();
        }
        catch (Exception e)
        {
            //log in the appropriate format dictated by the project
            e.printStackTrace();
        }
        return null;
    } public static DbAccess getWasPooledDbAccess()
    {
        try
        {
            return wsPooledDbManager.getDbAccess();
        }
        catch (Exception e)
        {
            //log in the appropriate format dictated by the project
            e.printStackTrace();
        }
        return null;
    }
}
```

Express Mail Label: 38554475US

SmDatabaseManager

```java
package com.ibm.sm.lib.db;

public class SmDatabaseManager
{
    private ConnectionDispenser connDispenser;
    private DbPropertyBean props;
    private DbType defaultType = DbType.THIN;

private SmDatabaseManager()
    {
    } public SmDatabaseManager(DbPropertyBean props, DbType type) throws Exception
    {
        this.props = props;
        createConnDispenser(type);
    } public SmDatabaseManager(ConnectionDispenser connDispenser)
    {
        this.connDispenser = connDispenser;
    } public ConnectionDispenser getConnectionDispenser()
    {
        return connDispenser;
    } public void setConnectionDispenser(ConnectionDispenser dispenser)
    {
        connDispenser = dispenser;
    } public DbAccess getDbAccess() throws Exception
    {
        if (connDispenser == null)
        {
            createConnDispenser(defaultType);
        }
        return new DbAccess(connDispenser);
    }
```

Express Mail Label: 38554475US

```
    private void createConnDispenser(DbType type) throws Exception
    {
        if (props != null)
        {
            if (type.equals(DbType.THIN))
                connDispenser = new ThinConnection(props);
            else if (type.equals(DbType.WEBSPHERE_POOL))
                connDispenser = new WebSphereConnection(props);
            else if (type.equals(DbType.WEBLOGIC_POOL))
                connDispenser = new WeblogicConnection(props);
            else if (type.equals(DbType.WEBLOGIC_JNDI))
                connDispenser = new WeblogicJndiConnection(props);
            else if (type.equals(DbType.WEBLOGIC_RMI))
                connDispenser = new WeblogicRmiConnection(props);
        }
    } public AdvancedDbAccess getAdvancedDbAccess() throws Exception
    {
        if (connDispenser == null)
        {
            createConnDispenser(defaultType);
        }
        return new AdvancedDbAccess(connDispenser);
    }
}
```

Express Mail Label: 38554475US

APPENDIX 2 – Members of Class DbAccess

Class DbAccess java.lang.Object
 |
 +--com.ibm.sm.lib.db.DbAccess

Direct Known Subclasses:
    AdvancedDbAccess

--- public class DbAccess
extends java.lang.Object

DbAccess contains a java.sql.Connection object, performs queries for a client, returns a java.sql.ResultSet to the client, and closes the connection for the client. The key here is that this class contains the java.sql.Connection in a "has-a" relationship. This means that direct access to the Connection object is prohibited so that DbAccess can manage the resources contained in this class.

Clients that must utilize PreparedStatements and/or stored procedures should use the AdvancedDbAccess class, as it provides access to the connection object as well as methods for accessing the PreparedStatment and CallableStatement classes.

An example of common usages of DbAccess can be found in SimpleClient

See Also:
    AdvancedDbAccess

---

Constructor Summary
DbAccess(ConnectionDispenser connDispenser)
        Constructs DbAccess with a connection dispenser Method Summary
            void connect()
                    Makes a connection to the database and stores
                that connection object in this class.
            void disconnect()
                    Makes a connection to the database and stores
                that connection object in this class.
            void dispose()

SVL920010064US1

Express Mail Label: ___ 38554475US

Cleans up all the resources within this class.
com.ibm.sm.lib.db.ResultSet execQuery(java.lang.String sqlQuery)
                      Executes a SQL QUERY, and returns the
ResultSet.
        int execUpdate(java.lang.String sqlQuery)
                Executes a SQL INSERT or UPDATE, and returns
                how many rows were affected.
   protected void finalize()

protected getConnection()
   java.sql.Connection      Makes a connection to the database, stores that
                connection in DbAccess, then returns the connection to
                the caller of this method
ConnectionDispenser getConnectionDispenser()
                    Returns the current ConnectionDispenser object
            reference.
     boolean isConnected()
                    Indicates whether DbAccess contains a "live"
                connection or not.
       void setConnectionDispenser(ConnectionDispenser connDispenser)

Sets the current ConnectionDispener that
                DbAccess will use to lookup its connections.

Methods inherited from class java.lang.Object
clone, equals, getClass, hashCode, notify, notifyAll, toString, wait,
wait, wait Constructor Detail DbAccess public DbAccess(ConnectionDispenser connDispenser)

Constructs DbAccess with a connection dispenser

Method Detail connect public void connect()
       throws com.ibm.sm.lib.db.SQLException Makes a connection to the database and stores that connection object
   in this class.

SVL920010064US1

Express Mail Label: 38554475US

Preconditions: A connection is not connected (alive)
Postconditions: The connection is "alive"

--- execQuery public com.ibm.sm.lib.db.ResultSet execQuery(java.lang.String sqlQuery)
         throws com.ibm.sm.lib.db.SQLException Executes a SQL QUERY, and returns the ResultSet.

Precondition: There must be a connection present.
Postcondition: The connection is still "alive"
Invariant: The connection is alive

--- execUpdate public int execUpdate(java.lang.String sqlQuery)
       throws com.ibm.sm.lib.db.SQLException Executes a SQL INSERT or UPDATE, and returns how many rows were affected.

Precondition: There must be a connection present.
Postcondition: The connection is still "alive"
Invariant: The connection is alive

--- isConnected public boolean isConnected()

Indicates whether DbAccess contains a "live" connection or not.

--- dispose public void dispose()

Cleans up all the resources within this class. This involves closing

Express Mail Label: . ,8554475US the connection and the statement, as well as releasing all object references for garbage collection.

--- finalize protected void finalize()

> Overrides:
> finalize in class java.lang.Object

--- disconnect public void disconnect()

> Makes a connection to the database and stores that connection object in this class.
>
> Preconditions: The connection is "alive"
> Postconditions: A connection is not connected (alive)

--- getConnection protected java.sql.Connection getConnection()
                      throws com.ibm.sm.lib.db.SQLException > Makes a connection to the database, stores that connection in DbAccess, then returns the connection to the caller of this method
> Returns:
>     java.sql.Connection
> Throws:
>     java.sql.SQLException -

--- getConnectionDispenser public ConnectionDispenser getConnectionDispenser()

> Returns the current ConnectionDispenser object reference.

Express Mail Label: . 38554475US

--- setConnectionDispenser public void setConnectionDispenser(ConnectionDispenser connDispenser)

Sets the current ConnectionDispener that DbAccess will use to lookup its connections.

---

Express Mail Label: 38554475US

--- com.ibm.sm.lib.db
Class DbPropertyBean java.lang.Object
 |
 +--com.ibm.sm.lib.db.DbPropertyBean Direct Known Subclasses:
 PoolPropertyBean

--- public class DbPropertyBean
extends java.lang.Object

DbPropertyBean is a simple data object that contains all the properties needed to make a database connection. If any additional properties are needed for some custom type of connection, then this class can be subclassed and the additional properties can be put in the subclass

---

Constructor Summary
DbPropertyBean(java.lang.String user, java.lang.String pass, java.lang.String url, java.lang.String driver)
 Constructs this data object.

Method Summary
 void addDriver(java.lang.String driver)
  Adds the name of the database driver to
 the existing list of database driver names.
java.util.Enumeration getDrivers()
  Returns all the names of database
 drivers as String objects in the form of an
 Enumeration
 java.lang.String getPassword()
  Returns the password property.
 java.lang.String getUrl()
  Returns the database url property.
 java.lang.String getUser()
  Returns the username property.

Methods inherited from class java.lang.Object
clone, equals, finalize, getClass, hashCode, notify, notifyAll, toString, wait, wait, wait

SVL920010064US1

Express Mail Label: 38554475US

Constructor Detail

DbPropertyBean public DbPropertyBean(java.lang.String user,
           java.lang.String pass,
           java.lang.String url,
           java.lang.String driver)

Constructs this data object.

Method Detail addDriver public void addDriver(java.lang.String driver)

Adds the name of the database driver to the existing list of database driver names.

--- getUser public java.lang.String getUser()

Returns the username property.

--- getPassword public java.lang.String getPassword()

Returns the password property.

--- getUrl public java.lang.String getUrl()

Returns the database url property.

SVL920010064US1

Express Mail Label: . 38554475US

--- getDrivers public java.util.Enumeration getDrivers()

Returns all the names of database drivers as String objects in the form of an Enumeration Express Mail Label: ... 38554475US ConnectionDispenser

--- com.ibm.sm.lib.db
Interface ConnectionDispenser

All Known Implementing Classes:
   ThinConnection, WeblogicConnection, WeblogicJndiConnection,
   WeblogicRmiConnection, WebSphereConnection

--- public interface ConnectionDispenser

---

Method Summary
java.sql.Connection getNewConnection()
        Creates a new Connection object or grabs a
        new Connection object from an existing "pool" of
        connections.
  DbPropertyBean getProperties()
        Returns the current properties contained
        by the ConnectionDispenser
  void setProperties(DbPropertyBean props)
        Sets the properties used by the
        ConnectionDispenser to lookup and obtain a
        java.sql.Connection object.

Method Detail getNewConnection public java.sql.Connection getNewConnection()
              throws java.sql.SQLException Creates a new Connection object or grabs a new Connection object from
   an existing "pool" of connections.

Preconditions: The Connection object should have already been
   "looked-up", but not created yet.
   Postconditions: The Connection must be alive

---

SVL920010064US1

Express Mail Label: L 38554475US setProperties public void setProperties(DbPropertyBean props)
          throws java.lang.Exception > Sets the properties used by the ConnectionDispenser to lookup and obtain a java.sql.Connection object. If implementers need more or different properties than that provided in the DbPropertyBean, they can subclass DbPropertyBean and pass the subclass into this method. If that is done, then when implementing this method simply cast the DbPropertyBean to the appropriate class.
>
> Preconditions: The properties must be correct and the database must be "up" and ready.
> Postconditions: After this method exits, the java.sql.Connection class should be "looked-up" in whatever manner needed. However, the java.sql.Connection object should not be created yet.

--- getProperties public DbPropertyBean getProperties()

> Returns the current properties contained by the ConnectionDispenser

Express Mail Label: L 38554475US

AdvancedDBAccess
-------------------------------------------------------------------------- com.ibm.sm.lib.db
Class AdvancedDbAccess java.lang.Object
 |
 +--com.ibm.sm.lib.db.DbAccess
     |
     +--com.ibm.sm.lib.db.AdvancedDbAccess

-------------------------------------------------------------------------- public class AdvancedDbAccess
extends DbAccess

AdvancedDbAccess provides methods to retrieve a java.sql.CallableStatement
and java.sql.PreparedStatement objects. This class also allows access to
the java.sql.Connection object; whereas, DbAccess does not.

--------------------------------------------------------------------------

Constructor Summary
AdvancedDbAccess(ConnectionDispenser connDispenser)
        Constructs AdvancedDbAccess with a connection dispenser Method Summary
            void dispose()
                    Cleans up all the resources within
                this class.
        protected  void finalize()

java.sql.CallableStatement getCallableStatement(java.lang.String sql)
                Creates and returns a
                CallableStatement instance.
java.sql.CallableStatement getCallableStatement(java.lang.String sql,
                int rsSetType, int rsSetConcurreny)
                Creates and returns a
                CallableStatement instance.
    java.sql.Connection getConnection()
                Makes a connection to the database,
                stores that connection in DbAccess, then
                returns the connection to the caller of this
                method.
java.sql.PreparedStatement getPreparedStatement(java.lang.String sql)

Express Mail Label: L...38554475US

> Creates and returns a
> PreparedStatement instance.
> java.sql.PreparedStatement getPreparedStatement(java.lang.String sql,
> int rsSetType, int rsSetConcurreny)
> Creates and returns a
> PreparedStatement instance.

Methods inherited from class com.ibm.sm.lib.db.DbAccess
connect, disconnect, execQuery, execUpdate, getConnectionDispenser,
isConnected, setConnectionDispenser Methods inherited from class java.lang.Object
clone, equals, getClass, hashCode, notify, notifyAll, toString, wait,
wait, wait Constructor Detail AdvancedDbAccess public AdvancedDbAccess(ConnectionDispenser connDispenser)

> Constructs AdvancedDbAccess with a connection dispenser

Method Detail dispose public void dispose()

> Cleans up all the resources within this class. This involves closing
> the connection and the statement, as well as releasing all object
> references for garbage collection.
> Overrides:
> dispose in class DbAccess

--- finalize protected void finalize()

> Overrides:
> finalize in class DbAccess

---

SVL920010064US1

Express Mail Label: L 38554475US getCallableStatement public java.sql.CallableStatement getCallableStatement(java.lang.String sql)
                    throws com.ibm.sm.lib.db.SQLException Creates and returns a CallableStatement instance.

Precondition: A connection must be present
   PostCondition: The CallableStatement is valid, and parameters could be
   passed in.
   When done, call executeQuery, executeUpdate, or execute on the
   CallableStatement object.

--- getCallableStatement public java.sql.CallableStatement getCallableStatement(java.lang.String sql,
                    int rsSetType,
                    int rsSetConcurreny)
                    throws com.ibm.sm.lib.db.SQLException Creates and returns a CallableStatement instance.

Precondition: A connection must be present
   PostCondition: The CallableStatement is valid, and parameters could be
   passed in.
   When done, call executeQuery, executeUpdate, or execute on the
   CallableStatement object.

--- getConnection public java.sql.Connection getConnection()
                    throws com.ibm.sm.lib.db.SQLException Makes a connection to the database, stores that connection in
   DbAccess, then returns the connection to the caller of this method.

This method is overriden and made more visible from its
   superclass/parent, DbAccess.
   Overrides:
      getConnection in class DbAccess
   Returns:

Express Mail Label: L. 38554475US java.sql.Connection
Throws:
    java.sql.SQLException -

--- getPreparedStatement public java.sql.PreparedStatement getPreparedStatement(java.lang.String sql)
                    throws com.ibm.sm.lib.db.SQLException Creates and returns a PreparedStatement instance.

Precondition: A connection must be present
    PostCondition: The PreparedStatement is valid, and parameters could be
    passed in.
    When done, call executeQuery, executeUpdate, or execute on the
    PreparedStatement object.

--- getPreparedStatement public java.sql.PreparedStatement getPreparedStatement(java.lang.String sql,
                    int rsSetType,
                    int rsSetConcurreny)
                    throws com.ibm.sm.lib.db.SQLException Creates and returns a PreparedStatement instance.

Precondition: A connection must be present
    PostCondition: The PreparedStatement is valid, and parameters could be
    passed in.
    When done, call executeQuery, executeUpdate, or execute on the
    PreparedStatement object.

SVL920010064US1

Express Mail Label: L. 38554475US

Class DBType
------------------------------------------------------------------- com.ibm.sm.lib.db
Class DbType java.lang.Object
 |
 +--com.ibm.sm.lib.db.DbType

------------------------------------------------------------------- public class DbType
extends java.lang.Object

DbType contains the types of Connections possible. Instead of type-checking
using and int or String, we limit the number of possibilities by
type-checking using DbType objects.

-------------------------------------------------------------------

Field Summary
static DbType THIN
          Corresponds to the ThinConnection class
static DbType WEBLOGIC_JNDI
          Corresponds to the WeblogicJndiConnection class
static DbType WEBLOGIC_POOL
          Corresponds to the WeblogicConnection class
static DbType WEBLOGIC_RMI
          Corresponds to the WeblogicRmiConnection class
static DbType WEBSPHERE_POOL
          Corresponds to the WebSphereConnection class Constructor Summary
protected DbType(int x)
          Constructs the object.

Methods inherited from class java.lang.Object
clone, equals, finalize, getClass, hashCode, notify, notifyAll, toString,
wait, wait, wait Field Detail

THIN

Express Mail Label: L. ..8554475US public static final DbType THIN

Corresponds to the ThinConnection class

---

WEBSPHERE_POOL public static final DbType WEBSPHERE_POOL

Corresponds to the WebSphereConnection class

---

WEBLOGIC_POOL public static final DbType WEBLOGIC_POOL

Corresponds to the WeblogicConnection class

---

WEBLOGIC_JNDI public static final DbType WEBLOGIC_JNDI

Corresponds to the WeblogicJndiConnection class

---

WEBLOGIC_RMI public static final DbType WEBLOGIC_RMI

Corresponds to the WeblogicRmiConnection class

Constructor Detail

DbType protected DbType(int x)

Constructs the object.

Express Mail Label: .  ,8554475US

Class PoolPropertyBean
---------------------------------------------------------------------- com.ibm.sm.lib.db
Class PoolPropertyBean java.lang.Object
 |
 +--com.ibm.sm.lib.db.DbPropertyBean
    |
    +--com.ibm.sm.lib.db.PoolPropertyBean

---------------------------------------------------------------------- public class PoolPropertyBean
extends DbPropertyBean

PoolPropertyBean is a simple data object that contains all the properties
needed to make a database connection. It is a subclass of DbPropertyBean,
so it inherits all the existing properties from there.

----------------------------------------------------------------------

Constructor Summary
PoolPropertyBean(java.lang.String url, java.lang.String dataSourceName)
    Constructs this data object with only the url and
dataSourceName.
PoolPropertyBean(java.lang.String url, java.lang.String driver,
java.lang.String dataSourceName)
    Constructs this data object with only the url, database driver,
and dataSourceName.
PoolPropertyBean(java.lang.String user, java.lang.String pass,
java.lang.String url, java.lang.String driver,
java.lang.String dataSourceName)
    Constructs this data object with all the properties.

Method Summary
java.lang.String getDataSourceName()
            Returns the dataSourceName property.

Methods inherited from class com.ibm.sm.lib.db.DbPropertyBean
addDriver, getDrivers, getPassword, getUrl, getUser Methods inherited from class java.lang.Object
clone, equals, finalize, getClass, hashCode, notify, notifyAll, toString, Express Mail Label: L..58554475US wait, wait, wait Constructor Detail PoolPropertyBean public PoolPropertyBean(java.lang.String user,
        java.lang.String pass,
        java.lang.String url,
        java.lang.String driver,
        java.lang.String dataSourceName)

Constructs this data object with all the properties.

---

PoolPropertyBean public PoolPropertyBean(java.lang.String url,
        java.lang.String driver,
        java.lang.String dataSourceName)

Constructs this data object with only the url, database driver, and dataSourceName.

---

PoolPropertyBean public PoolPropertyBean(java.lang.String url,
        java.lang.String dataSourceName)

Constructs this data object with only the url and dataSourceName.

Method Detail getDataSourceName public java.lang.String getDataSourceName()

Returns the dataSourceName property.

Express Mail Label: L. ,8554475US

Class SmDatabaseManager
------------------------------------------------------------------------- com.ibm.sm.lib.db
Class SmDatabaseManager java.lang.Object
 |
 +--com.ibm.sm.lib.db.SmDatabaseManager

------------------------------------------------------------------------- public class SmDatabaseManager
extends java.lang.Object

SmDatabaseManager is the class that should be contained to interface with the rest of the database access component. The purpose of this class is simple: to provide an easy access to the rest of the component. The component really is not difficult to use, but to make it even easier (for applications that do not need any customization) this class was created to bring all the pieces together.

Here is an example of how to use this class in a "has-a" relationship:

```
private static SmDatabaseManager thinDbManager;
private static SmDatabaseManager webSphereDbManager;

static {

String user, pass, url, driver;
    String wasUser, wasPass, wasUrl, wasDriver;

//read property file, database
    //or
    //hard code user, pass, url, and driver
    //and populate variables DbPropertyBean thinProps = new DbPropertyBean(user,
    pass, url, driver);
    DbPropertyBean wasProps = new PoolPropertyBean(wasUser,
    wasPass, wasUrl, wasDriver, wasDsn);

try { webSphereDbManager = new
        SmDatabaseManager(wasProps,
```

Express Mail Label: ˙ ,8554475US

```
        DbType.WEBSPHERE_POOL);
        thinDbManager = new
        SmDatabaseManager(thinProps, DbType.THIN);

}
    catch (Exception e) {

//log exception to appropriate format

}
    .
    .
    .

}
```

Keep in mind that if SmDatabaseManager does not in someway fulfill the needs of the implementer, then a project-specific DatabaseManager can be written. If that is the case then the need for another class to contain this project-specific class would be minimized. An implementer could easily customize the project-specific DatabaseManager instead of utilizing the SmDatabaseManager and another class to contain it.

There are two ways to instantiate this class. The first is to pass in a DbPropertyBean and a DbType object. The DbType object dictates which concrete ConnectionDispenser class to create. The second way instantiate this class is to pass in an already created ConnectionDispenser.

Once this class is created and valid, the getDbAccess method can be called to gain access to a DbAccess object that can obtain a java.sql.Connection object.

Preconditions: Database must be "up"

See Also:
    ConnectionDispenser, DbPropertyBean, DbType,
    PoolPropertyBean

---

Constructor Summary
SmDatabaseManager(ConnectionDispenser connDispenser)
    Constructs a SmDatabaseManager using an existing ConnectionDispenser object.

Express Mail Label: t.. ..)8554475US

SmDatabaseManager(DbPropertyBean props, DbType type)
    Constructs a SmDatabaseManager using a valid DbPropertyBean and the corresponding DbType object.

Method Summary
    AdvancedDbAccess getAdvancedDbAccess()
            Returns a newly created instance of
            AdvancedDbAccess using the current
            ConnectionDispenser.
    ConnectionDispenser getConnectionDispenser()
            Returns the ConnectionDispenser that is
            being used to construct DbAccess and SpAccess
            classes.
        DbAccess getDbAccess()
            Returns a newly created instance of
            DbAccess using the current ConnectionDispenser.
        void setConnectionDispenser(ConnectionDispenser dispenser)

Sets the ConnectionDispenser used to create
            DbAccess and SpAccess objects Methods inherited from class java.lang.Object
clone, equals, finalize, getClass, hashCode, notify, notifyAll, toString, wait, wait, wait Constructor Detail SmDatabaseManager public SmDatabaseManager(DbPropertyBean props,
            DbType type)
        throws java.lang.Exception Constructs a SmDatabaseManager using a valid DbPropertyBean
    and the corresponding DbType object.

Preconditions: DbPropertyBean must be valid and must
    correspond to the DbType object.

------------------------------------------------------------------

SmDatabaseManager public SmDatabaseManager(ConnectionDispenser connDispenser)

Express Mail Label: E .8554475US

Constructs a SmDatabaseManager using an existing ConnectionDispenser object.

Preconditions: A valid ConnectionDispenser

Method Detail getConnectionDispenser public ConnectionDispenser getConnectionDispenser()

Returns the ConnectionDispenser that is being used to construct DbAccess and SpAccess classes.

--- setConnectionDispenser public void setConnectionDispenser(ConnectionDispenser dispenser)

Sets the ConnectionDispenser used to create DbAccess and SpAccess objects

--- getDbAccess public DbAccess getDbAccess()
          throws java.lang.Exception

Returns a newly created instance of DbAccess using the current ConnectionDispenser.

Preconditions: The ConnectionDispenser must be created and valid.
Postconditions: The client using SmDatabaseManager should have a valid DbAccess.

--- getAdvancedDbAccess public AdvancedDbAccess getAdvancedDbAccess()
          throws java.lang.Exception Returns a newly created instance of AdvancedDbAccess using

SVL920010064US1

Express Mail Label: 1. ..8554475US the current ConnectionDispenser.

Preconditions: The ConnectionDispenser must be created and valid.
Postconditions: The client using SmDatabaseManager should have a valid AdvancedDbAccess.

Express Mail Label: L. ..38554475US

Class ThinConnection
--- com.ibm.sm.lib.db
Class ThinConnection java.lang.Object
 |
 +--com.ibm.sm.lib.db.ThinConnection

--- public class ThinConnection
extends java.lang.Object
implements ConnectionDispenser

---

Constructor Summary
ThinConnection(DbPropertyBean props)
        Constructs the object.

Method Summary
java.sql.Connection getNewConnection()
                Creates a new Connection object.
    DbPropertyBean getProperties()
                Returns the current properties contained
            by the ConnectionDispenser, which is a
            DbPropertyBean
        void setProperties(DbPropertyBean props)
                Sets the properties used by the
            ConnectionDispenser to lookup and obtain a
            java.sql.Connection object.

Methods inherited from class java.lang.Object
clone, equals, finalize, getClass, hashCode, notify, notifyAll, toString, wait, wait, wait Constructor Detail ThinConnection public ThinConnection(DbPropertyBean props)
        throws java.lang.Exception

SVL920010064US1

Express Mail Label: L. ..38554475US

Constructs the object. Expecting a DbPropertyBean.

Method Detail getNewConnection public java.sql.Connection getNewConnection()
      throws java.sql.SQLException Creates a new Connection object.

Preconditions: The Connection object should have already been
 "looked-up", but not created yet. This can be achieved by calling the
 Constructor with valid properties and/or by calling the setProperties
 method.
 Postconditions: The Connection must be alive
 Specified by:
  getNewConnection in interface ConnectionDispenser

--- setProperties public void setProperties(DbPropertyBean props)
     throws java.lang.Exception Sets the properties used by the ConnectionDispenser to lookup and
 obtain a java.sql.Connection object.

Preconditions: The properties must be a valid DbPropertyBean and the
 database must be "up" and ready.
 Postconditions: After this method exits, the java.sql.Connection class
 should be "looked-up" in whatever manner needed. However, the
 java.sql.Connection object should not be created yet.
 Specified by:
  setProperties in interface ConnectionDispenser

--- getProperties public DbPropertyBean getProperties()

Returns the current properties contained by the ConnectionDispenser,
 which is a DbPropertyBean
 Specified by:

Express Mail Label: E... ,8554475US getProperties in interface ConnectionDispenser Express Mail Label: E, ..38554475US Class WebLogicConnection
--- com.ibm.sm.lib.db
Class WeblogicConnection java.lang.Object
 |
 +--com.ibm.sm.lib.db.WeblogicConnection

--- public class WeblogicConnection
extends java.lang.Object
implements ConnectionDispenser

---

Constructor Summary
WeblogicConnection(DbPropertyBean props)
        Constructs the object.

Method Summary
java.sql.Connection getNewConnection()
                Grabs a new Connection object from an
            existing "pool" of connections.
    DbPropertyBean getProperties()
                Returns the current properties contained
            by the ConnectionDispenser, which is a
            PoolPropertyBean
        void setProperties(DbPropertyBean props)
                Sets the properties used by the
            ConnectionDispenser to lookup and obtain a
            java.sql.Connection object.

Methods inherited from class java.lang.Object
clone, equals, finalize, getClass, hashCode, notify, notifyAll, toString,
wait, wait, wait Constructor Detail WeblogicConnection public WeblogicConnection(DbPropertyBean props)
            throws java.lang.Exception Express Mail Label: E. ..38554475US Constructs the object. Expecting a PoolPropertyBean!
   See Also:
      PoolPropertyBean Method Detail getNewConnection public java.sql.Connection getNewConnection()
                     throws java.sql.SQLException Grabs a new Connection object from an existing "pool" of connections.

Preconditions: The Connection object should have already been
   "looked-up", but not created yet. This can be achieved by calling the
   Constructor with valid properties and/or by calling the setProperties
   method.
   Postconditions: The Connection must be alive
   Specified by:
      getNewConnection in interface ConnectionDispenser

--- setProperties public void setProperties(DbPropertyBean props)
         throws java.lang.Exception Sets the properties used by the ConnectionDispenser to lookup and
   obtain a java.sql.Connection object.

Preconditions: The properties must be a valid PoolPropertyBean and the
   database must be "up" and ready.
   Postconditions: After this method exits, the java.sql.Connection class
   should be "looked-up" in whatever manner needed. However, the
   java.sql.Connection object should not be created yet.
   Specified by:
      setProperties in interface ConnectionDispenser
   See Also:
      PoolPropertyBean

--- getProperties

Express Mail Label: E. 38554475US public DbPropertyBean getProperties()

> Returns the current properties contained by the ConnectionDispenser, which is a PoolPropertyBean
> Specified by:
> > getProperties in interface ConnectionDispenser Express Mail Label: E. ..38554475US Class WeblogicJndiConnection
-------------------------------------------------------------------------- com.ibm.sm.lib.db
Class WeblogicJndiConnection java.lang.Object
 |
 +--com.ibm.sm.lib.db.WeblogicJndiConnection

-------------------------------------------------------------------------- public class WeblogicJndiConnection
extends java.lang.Object
implements ConnectionDispenser

--------------------------------------------------------------------------

Constructor Summary
WeblogicJndiConnection(DbPropertyBean props)
    Constructs the object.

Method Summary
java.sql.Connection getNewConnection()
    Grabs a new Connection object from an
    existing "pool" of connections.
DbPropertyBean getProperties()
    Returns the current properties contained
    by the ConnectionDispenser, which is a
    PoolPropertyBean
void setProperties(DbPropertyBean props)
    Sets the properties used by the
    ConnectionDispenser to lookup and obtain a
    java.sql.Connection object.

Methods inherited from class java.lang.Object
clone, equals, finalize, getClass, hashCode, notify, notifyAll, toString,
wait, wait, wait Constructor Detail WeblogicJndiConnection public WeblogicJndiConnection(DbPropertyBean props)
    throws java.lang.Exception

SVL920010064US1

Express Mail Label: EL J8554475US

Constructs the object. Expecting a PoolPropertyBean!
See Also:
    PoolPropertyBean Method Detail getNewConnection public java.sql.Connection getNewConnection()
                throws java.sql.SQLException Grabs a new Connection object from an existing "pool" of connections.

Preconditions: The Connection object should have already been
"looked-up", but not created yet. This can be achieved by calling the
Constructor with valid properties and/or by calling the setProperties
method.
Postconditions: The Connection must be alive
Specified by:
    getNewConnection in interface ConnectionDispenser

------------------------------------------------------------ setProperties public void setProperties(DbPropertyBean props)
       throws java.lang.Exception Sets the properties used by the ConnectionDispenser to lookup and
obtain a java.sql.Connection object.

Preconditions: The properties must be a valid PoolPropertyBean and the
database must be "up" and ready.
Postconditions: After this method exits, the java.sql.Connection class
should be "looked-up" in whatever manner needed. However, the
java.sql.Connection object should not be created yet.
Specified by:
    setProperties in interface ConnectionDispenser
See Also:
    PoolPropertyBean

------------------------------------------------------------ getProperties

Express Mail Label: t.. .,8554475US public DbPropertyBean getProperties()

Returns the current properties contained by the ConnectionDispenser, which is a PoolPropertyBean
    Specified by:
        getProperties in interface ConnectionDispenser Express Mail Label: E. ..58554475US Class WeblogicRmiConnection
----------------------------------------------------------------------- com.ibm.sm.lib.db
Class WeblogicRmiConnection java.lang.Object
 |
 +--com.ibm.sm.lib.db.WeblogicRmiConnection

----------------------------------------------------------------------- public class WeblogicRmiConnection
extends java.lang.Object
implements ConnectionDispenser

-----------------------------------------------------------------------

Constructor Summary
WeblogicRmiConnection(DbPropertyBean props)
    Constructs the object.

Method Summary
java.sql.Connection getNewConnection()
    Grabs a new Connection object from an
    existing "pool" of connections.
DbPropertyBean getProperties()
    Returns the current properties contained
    by the ConnectionDispenser, which is a
    PoolPropertyBean
void setProperties(DbPropertyBean props)
    Sets the properties used by the
    ConnectionDispenser to lookup and obtain a
    java.sql.Connection object.

Methods inherited from class java.lang.Object
clone, equals, finalize, getClass, hashCode, notify, notifyAll, toString,
wait, wait, wait Constructor Detail WeblogicRmiConnection public WeblogicRmiConnection(DbPropertyBean props)
    throws java.lang.Exception

SVL920010064US1

Express Mail Label: L̲ ̲ ̲8554475US

Constructs the object. Expecting a PoolPropertyBean!
See Also:
    PoolPropertyBean Method Detail getNewConnection public java.sql.Connection getNewConnection()
                throws java.sql.SQLException Grabs a new Connection object from an existing "pool" of connections.

Preconditions: The Connection object should have already been
"looked-up", but not created yet. This can be achieved by calling the
Constructor with valid properties and/or by calling the setProperties
method.
Postconditions: The Connection must be alive
Specified by:
    getNewConnection in interface ConnectionDispenser

--- setProperties public void setProperties(DbPropertyBean props)
        throws java.lang.Exception Sets the properties used by the ConnectionDispenser to lookup and
obtain a java.sql.Connection object.

Preconditions: The properties must be a valid PoolPropertyBean and the
database must be "up" and ready.
Postconditions: After this method exits, the java.sql.Connection class
should be "looked-up" in whatever manner needed. However, the
java.sql.Connection object should not be created yet.
Specified by:
    setProperties in interface ConnectionDispenser
See Also:
    PoolPropertyBean

--- getProperties

Express Mail Label: L, ..38554475US public DbPropertyBean getProperties()

Returns the current properties contained by the ConnectionDispenser,
   which is a PoolPropertyBean
   Specified by:
      getProperties in interface ConnectionDispenser Express Mail Label: L. 38554475US Class WebSphereConnection

--- com.ibm.sm.lib.db
Class WebSphereConnection java.lang.Object
 |
 +--com.ibm.sm.lib.db.WebSphereConnection

--- public class WebSphereConnection
extends java.lang.Object
implements ConnectionDispenser

---

Constructor Summary
WebSphereConnection(DbPropertyBean props)
 Constructs the object.

Method Summary
java.sql.Connection getNewConnection()
 Grabs a new Connection object from an
 existing "pool" of connections.
DbPropertyBean getProperties()
 Returns the current properties contained
 by the ConnectionDispenser, which is a
 PoolPropertyBean
void setProperties(DbPropertyBean props)
 Sets the properties used by the
 ConnectionDispenser to lookup and obtain a
 java.sql.Connection object.

Methods inherited from class java.lang.Object
clone, equals, finalize, getClass, hashCode, notify, notifyAll, toString, wait, wait, wait Constructor Detail WebSphereConnection public WebSphereConnection(DbPropertyBean props)
 throws java.lang.Exception Express Mail Label: L. 8554475US Constructs the object. Expecting a PoolPropertyBean!
See Also:
    PoolPropertyBean Method Detail getNewConnection public java.sql.Connection getNewConnection()
                throws java.sql.SQLException Grabs a new Connection object from an existing "pool" of connections.

Preconditions: The Connection object should have already been "looked-up", but not created yet. This can be achieved by calling the Constructor with valid properties and/or by calling the setProperties method.
Postconditions: The Connection must be alive.
Specified by:
    getNewConnection in interface ConnectionDispenser

--- setProperties public void setProperties(DbPropertyBean props)
        throws java.lang.Exception Sets the properties used by the ConnectionDispenser to lookup and obtain a java.sql.Connection object.

Preconditions: The properties must be a valid PoolPropertyBean and the database must be "up" and ready.
Postconditions: After this method exits, the java.sql.Connection class should be "looked-up" in whatever manner needed. However, the java.sql.Connection object should not be created yet.
Specified by:
    setProperties in interface ConnectionDispenser
See Also:
    PoolPropertyBean

--- getProperties

Express Mail Label: EL38554475US public DbPropertyBean getProperties()

Returns the current properties contained by the ConnectionDispenser, which is a PoolPropertyBean
    Specified by:
        getProperties in interface ConnectionDispenser

I claim:

1. A method of connecting application programs to a database management system through an object oriented interface between the database and the application program, said object oriented interface comprising classes, including a database access class, and method objects to implement the interface, and create and manage database connections, said method comprising:
   a. accessing the database from the application program through the object oriented interface;
   c. retrieving database properties, and creating a first and a second object there from within the database access class, said first object containing properties needed to establish a connection to the database, and said second object is a connection manager object within the database access class, instantiating the interface and creating a connection to the database; and thereafter
   d. calling method objects within the database access class to access database content, execute queries, and disconnect from database content.

2. The method of claim 1 wherein the classes and method objects comprise application program specific connection managers to manage connections between application programs and the interface.

3. The method of claim 2 wherein the application program specific connection managers comprise:
   a. one or more application program specific connection manager classes to manage connections; and
   b. an object to retrieve database property information and create a repository containing properties needed to make connection to the database, and an object to create a link to a database specific object and make the connection to the database.

4. The method of claim 3 wherein connection, and property setting objects use the repository to retrieve database properties.

5. The method of claim 2 wherein the object oriented interface is a Java language implemented interface, the classes and method objects include application program specific connection managers to manage connections between application programs and the database, and the connection managers comprise:
   a. one or more of ThinConnection, WebSphereConnection, WebLogicConnection, WebLogicJndiConnection, and WebLogicRmiConnection classes to manage connections;
   b. a ProjectDatabaseAccess to retrieve database property information, and create a DbPropertyBean containing properties needed to make connection to the database, and creating a SmDatabaseManager to a ConnectionDispenser object and make the connection to the database.

6. The method of claim 5 wherein getNewConnection, and setProperties objects use DbPropertyBean to obtain db properties.

7. A database management system including at least one database server adapted to serve a plurality of disparate database clients through an object oriented interface between the at least one database server and a client, said interface including a database access class and methods within the database access class to implement the interface, and create and manage database connections, said system comprising:
   a. at least one object within the database access class adapted to retrieve database properties, and create an object there from containing properties needed to establish a connection to the database, and
   b. a connection manager method within the database access class to instantiate the interface and create a connection to the database, and thereafter call methods within the database access class to access database content, execute database queries on the database content, and disconnect from database content.

8. The database management system of claim 7 wherein the classes and methods comprise application program specific connection managers to manage connections between application programs and the interface.

9. The database management system of claim 8 wherein the object oriented interface methods comprise application program specific connection managers to manage connections between application programs and the database comprise:
   a) one or more application program specific connection managers to manage connections; and
   b) an object to retrieve database property information, and to create a repository containing properties needed to make connection to the database, and to create a link to a connection object and make the connection to the database.

10. The database management system of claim 9 wherein connection and property setting objects use the property repository to obtain database properties.

11. The database management system of claim 8 wherein the object oriented interface is a Java language implemented interface, and the methods comprise application program specific connection managers to manage connections between application programs and the database comprise:
    a. one or more of ThinConnection, WebSphereConnection, WebLogicConnection, WebLogicJndiConnection, and WebLogicRmiConnection classes to manage connections;
    b. a ProjectDatabaseAccess to retrieve database property information, and create a DbPropertyBean containing properties needed to make connection to the database, and creating a SmDatabaseManager to a ConnectionDispenser object and make the connection to the database.

12. The database management system of claim 11 wherein getNewConnection, and setProperties objects use DbPropertyBean to obtain database properties.

13. A program product comprising computer readable computer code residing on a storage medium, said computer readable computer code connecting application programs and database management system programs to configure and control an interface program between an application program and a database management system and comprising
    a. code to provide an object oriented interface between the database and the application program, said object oriented interface comprising classes including at least one database access class containing methods to implement the interface, define methods, and create and manage database connections
    b. code for accessing the database from the application program through the object oriented interface;
    c. code for retrieving database properties, and creating within the database access class a first object containing properties needed to establish a connection to the database, and a connection manager object to instantiate the interface and create a connection to the database; and
    d. code for thereafter calling methods within the database access class to access database content, execute database queries, disconnect from database content.

14. The program product of claim 13 wherein the methods comprise application program specific connection managers to manage connections between application programs and the interface.

15. The program product of claim 14 wherein the methods comprise application program specific connection managers to manage connections between application programs and the database comprise:
   a. one or more application program connection specific manager objects to manage connections;
   b. an access object to retrieve database property information, and create a repository containing properties needed to make connection to the database, to create a connection manager link to a connection object, and to make the connection to the database.

16. The program product of claim 15 wherein the connection object uses the repository object to obtain database properties.

17. The program product of claim 14 wherein the object oriented interface is a Java language implemented interface, and the comprise:
   a. one or more of ThinConnection, WebSphereConnection, WebLogicConnection, WebLogicJndiConnection, and WebLogicRmiConnection classes to manage connections;
   b. a ProjectDatabaseAccess to retrieve database property information, and create a DbPropertyBean containing properties needed to make connection to the database, and to create a SmDatabaseManager to a ConnectionDispenser object to make the connection to the database.

18. The program product of claim 17 wherein getNewConnection, and setProperties objects use DbPropertyBean to obtain database properties.

19. The program product of claim 13 wherein said program product is a distribution program product for distribution to end users.

20. The program product of claim 19 wherein said program product is compressed.

21. The program product of claim 19 wherein said program product is encrypted.

22. The program product of claim 13 wherein said program product resides on storage medium resident in one or more computers.

* * * * *